(12) United States Patent
Kojima et al.

(10) Patent No.: US 6,807,388 B1
(45) Date of Patent: Oct. 19, 2004

(54) DATA MONITORING METHOD, DATA MONITORING DEVICE, COPYING DEVICE, AND STORAGE MEDIUM

(75) Inventors: Akio Kojima, Neyagawa (JP); Yasuhiro Kuwahara, Moriguchi (JP); Tatsumi Watanabe, Souraku (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 09/914,216

(22) PCT Filed: Feb. 25, 2000

(86) PCT No.: PCT/JP00/01097
§ 371 (c)(1),
(2), (4) Date: Aug. 23, 2001

(87) PCT Pub. No.: WO00/51338
PCT Pub. Date: Aug. 31, 2000

(30) Foreign Application Priority Data

Feb. 26, 1999 (JP) .............................. 11/49996
Feb. 26, 1999 (JP) .............................. 11/49997

(51) Int. Cl.⁷ .............................................. G03G 15/00
(52) U.S. Cl. ........................................................ 399/80
(58) Field of Search ............................. 399/80, 19, 10, 399/8, 9

(56) References Cited

FOREIGN PATENT DOCUMENTS

| JP | 61-250659 | * | 11/1986 |
|---|---|---|---|
| JP | 63-60459 | * | 3/1988 |
| JP | 01-316783 | | 12/1989 |
| JP | 02-073284 | | 3/1990 |
| JP | 03-120561 | | 5/1991 |
| JP | 03-139974 | | 6/1991 |
| JP | 05-014706 | | 1/1993 |
| JP | 05-282448 | | 10/1993 |
| JP | 06-070134 | | 3/1994 |
| JP | 06-070150 | | 3/1994 |
| JP | 06-125459 | | 5/1994 |
| JP | 06-178066 | | 6/1994 |
| JP | 11-257352 | | 10/1999 |
| JP | 11-355562 | | 12/1999 |
| WO | WO 95/01043 | | 1/1995 |

* cited by examiner

Primary Examiner—Quana M. Grainger
(74) Attorney, Agent, or Firm—McDermott Will & Emery LLP

(57) ABSTRACT

Each copy elements of data being an object to be monitored such as printing data or reading data including at least one kind of copy elements is monitored according to at least one kind of copy inhibition information stored in inhibition information storage means and capable of being updated. By the monitoring, when one of the copy elements is judged to agree with the kind of coy inhibition information, input or output of the data being monitored is inhibited. Secrecy management information is given to the copy inhibition information, and a secrecy management level of a user is assigned to each user. In such a way, when the secrecy management level is higher than that of secrecy management information, the inhibition of the input or output is canceled. An ID for tracing a device which has copied a printed matter is given to the copied printed matter so as to prevent unauthorized copies form diffusing.

4 Claims, 18 Drawing Sheets

Fig. 13

| INFORMATION ID | PERMIT LEVEL | GROUP ID | INDIVIDUAL ID |
|---|---|---|---|
| D001 | A001 | X00 | ID1/PW1 |
| D002 | B001 | X00 | |
| D003 | C001 | X00 | ID1/PW1 |
| D004 | C002 | Y00 | ID1/PW1 |
| D005 | B002 | Z00 | |
| D006 | A002 | A00 | |
| ... | ... | ... | ... |
| Dnnn | P_lvl | Gnn | IDn/PWn |

670

DATA MONITORING METHOD, DATA MONITORING DEVICE, COPYING DEVICE, AND STORAGE MEDIUM

FIELD OF THE INVENTION

The invention relates to a data monitoring method for preventing copy-inhibited documents and image data from the unauthorized copying, and a device thereof.

DESCRIPTION OF THE PRIOR ARTS

In these days, it has become easy for respective devices connected with the network to obtain and print electronic data, as the network and the digitalization develop wide. Meanwhile, the desktop Publishing (DTP), of which the technology has been improved in order to produce images close to original data, can get copies more precise than ever. Thereby the infrastructure that enables a user to obtain electronic data and print them precisely is now consolidating.

On the other hand, the leak of secrecy regarding a document under the secrecy management gets into trouble in case where said document is copied. In addition, if it is easy to obtain copies that cannot be distinguished from the original, it is afraid that such method is utilized to the illegal use of copyright or the forgery of bank notes and securities. The damages in such cases will be enormous.

The conventional color copying machine has installed the function of preventing bank notes and etc. from the forgery. FIG. 18 shows a block diagram of the conventional color copying machine. In FIG. 18, image signals read from a scanner 110 are judged according to the image characteristics by a specific image judging means 120 to be that of the bank notes and the securities being an object of the copying inhibition. In case of that of the copy inhibition, it is arranged that the copy prevention function be activated so that the images may be reproduced after the converting to a thumbnail image or the reverse to a mirrored image. The image data thus processed in such a way may be outputted to a printer 130, so that the copied images can be easily distinguished as a forgery thing (for example, like an image processor disclosed in Japanese Laid-open Publication Nos. 01-316783, 11-275352, and 11-355562).

As the current trend, the number of documents and images, that are sent or received as paper documents or as electronic data, gets very large. There is a subject that a personal computer obtains secrecy electronic documents and copyright data in a simple way through network and then a high-speed printer copies the data illegally.

By the way, since the prescribed prior arts refers to the method for judging images of originals read by the scanner, it is not possible to deal with the prescribed subject regarding the electronic data that are not read by the scanner.

Besides, the prescribed prior arts have great influences over the society since it is very easy to forgery bank notes and etc., meanwhile it is possible only to inhibit the copying within the restricted limits. But, even in a specific business place, for example, there are various electronic data to be observed secret, and it is general that the contents of data are not constant for many hours but changeable along with the time elapsed.

However, it is hard for the prescribed prior arts to update the copy inhibition information at any time according to the environments.

Moreover, as electronic data gets to replace paper documents as described above, the number of specific secrecy documents stored in a server has increased in the business place. In addition, it becomes possible for unspecified persons to display such secrecy documents on a display as a printed matter, and then to copy and browse the documents. There are persons given an authorization to copy or browse these secrecy documents, while there are those not given. The restriction of the regulation varies depending on the kind of document. That is to say, there is a level of the secrecy management that is imparted to a document, and a specific person has to be allowed to copy and browse a document only when a management level given to a specific person is higher than the management level included in the documents. However, even the conventional prior arts cannot administrate the copying and the browsing in due consideration of the secrecy management level of electronic data.

The present invention is suggested to settle the above problems, and has an object to provide a data monitoring method and system that can prevent copy-inhibited data from the unauthorized copying beforehand and speedy.

The invention has another object to provide a data monitoring method and system that can freely update copy inhibition information referring to the inhibition of the browsing and the copying according to the environment.

In addition, the present invention has the other object to provide a data monitoring method and system that can freely select either the allowance or the inhibition of the copying according to the secrecy management level of electronic data.

DISCLOSURE OF INVENTION

The invention adopts the following means in order to achieve the above objects. Specifically, monitoring means monitors each copy element of monitoring object data consisting of at least one kind of copy element in accordance with at least one kind of copy inhibition information capable of being updated and stored in inhibition information storage. Inhibiting means inhibits input or output of monitoring object data if the monitoring means determines that each copy element of the data agrees with a kind of the copy inhibition information. Therefore, it is possible to inhibit the copying and browsing of monitoring object data such as printing data and so on that agree with the copy inhibition information.

The above mentioned copy inhibition information can be updated by means of updating means. The updating is preferable to be executed by a user having a right to update. Additionally, the updating can be executed by obtaining new inhibition information from a removable storage medium or passing through the network.

On the assumption that the log of the updating of the copy inhibition information is stored in storage means, and it is arranged that, in updating the copy inhibition information, the updating be executed only when the updating information of the copy inhibition information is later than the stored log information.

On the assumption that secrecy management information corresponding to each copy inhibition information is stored in advance in inhibition information storage together with the copy inhibition information, and it is arranged that the copy inhibition and the inhibition cancel be controlled in accordance with the secrecy management information and the user's secrecy management level. Thereby, it is possible to inactivate the function, if it is not necessary, to inhibit the copying and the browsing.

Since the copy inhibition information is concentrated and stored in a server device (master information storage) on the network, each device executing the copy inhibition processing can obtain the copy inhibition information simply by accessing said server. In this case, the copy inhibition information may be transferred from the server device to each device passing through a removal storage medium, or may be transmitted via network. It is possible to store in the server device secrecy management information corresponding to each of copy inhibition information in addition to the copy inhibition information.

The invention can inhibit the copying of printing data or browsing data as described above, and moreover can trace a device preparing a copied printed matter. That is to say, first specific information extracting means extracts ID information unique to a specific device concerned with the preparation of monitoring object data, and information imparting means imparts the ID information to the monitoring object data, thereby new copied data is prepared.

The ID information may be chip ID information imparted to Central Processing Unit (CPU), an IP address imparted to a device, or the like.

In addition, second specific information extracting means extracts specific application information unique to software concerned with the preparation of monitoring object data, and information imparting means imparts the specific application information to the monitoring object data, thereby new copied data is prepared. It is effective that a mail address registered by a user is used as the specific application information.

A copying device, which receives monitoring object data from an external device and prepares a copy based on the monitoring object data, can trace the copy as follows. That is to say, extracting means analyses the monitoring object data and extracts unique information specifying a specific device concerned with the preparation of the monitoring object data, and then specific information imparting means imparts the extracted unique information to the monitoring object data.

It is helpful that ID number specifying a personal computer, or an IP address imparted to a device is used as the unique information.

Moreover, it may be arranged that extracting means analyze the copied data and extracts unique information specifying software concerned with the copied data, and specific information imparting means imparts to a copy the extracted unique information as new copied data.

BRIEF DESCRIPTION OF THE INVENTION

FIG. 13 is a diagram showing a table of the secrecy management information used in the seventh embodiment of the invention.

PREFERRED EMBODIMENTS OF THE INVENTION

Figure 1:
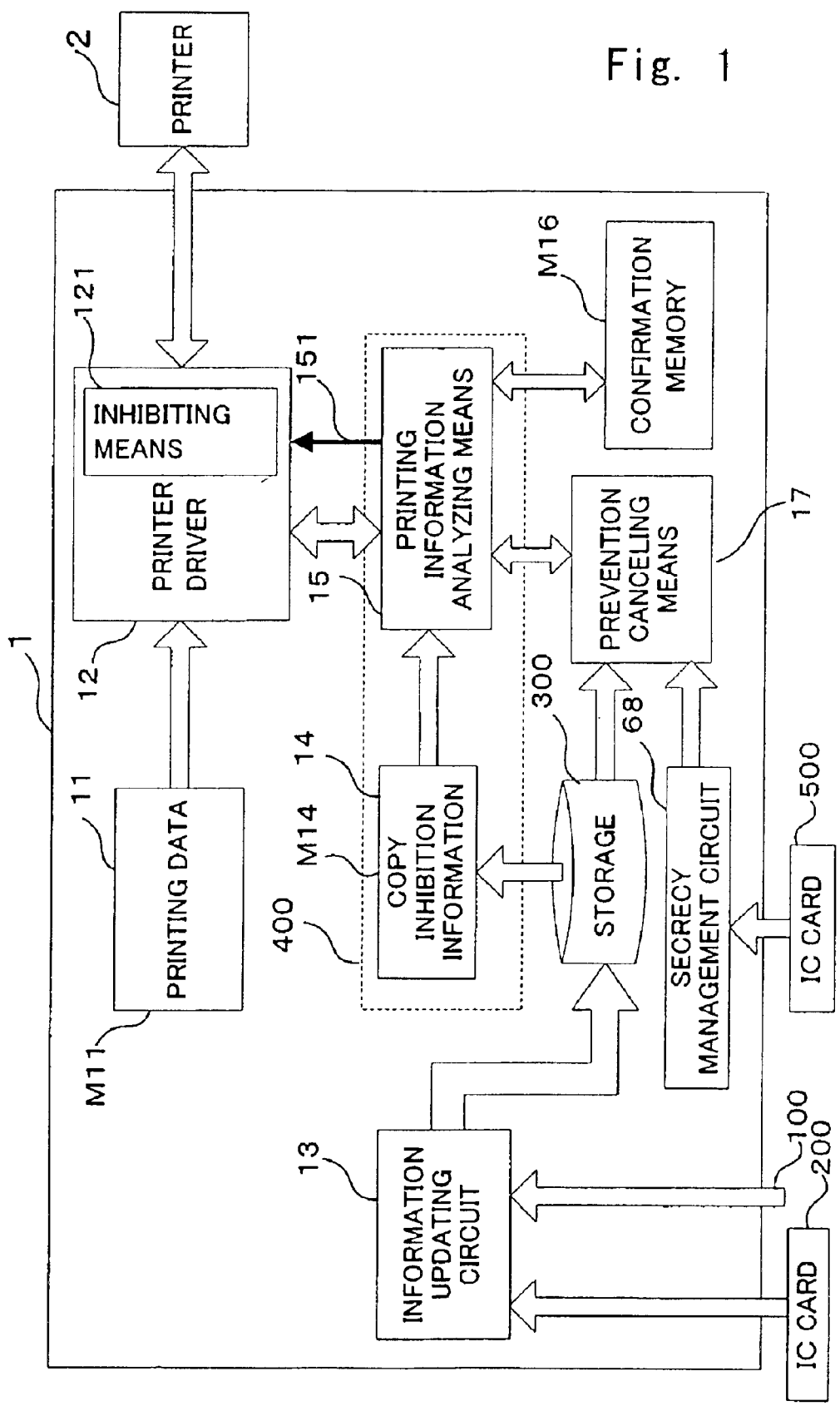
FIG. 1 is a block diagram of a personal computer in the first embodiment of the invention.

The preferred embodiments of the invention are explained according to the drawings hereinafter. In addition, a term of the copying in the following explanation is defined as not only the case where a printed matter equivalent to a specific data (an object data) is produced, but also a case where the object data is browsed by displaying the data on a displaying device. Accordingly, if the invention is applied to the browsing, the term including "print" ("printing data", for example) should be change to "browse" ("browsing data"). In order to distinguish a working memory from a nonvolatile storage medium such as a hard disk, the reference numeral M is imparted to a working memory.

Embodiment 1

Figure 2:
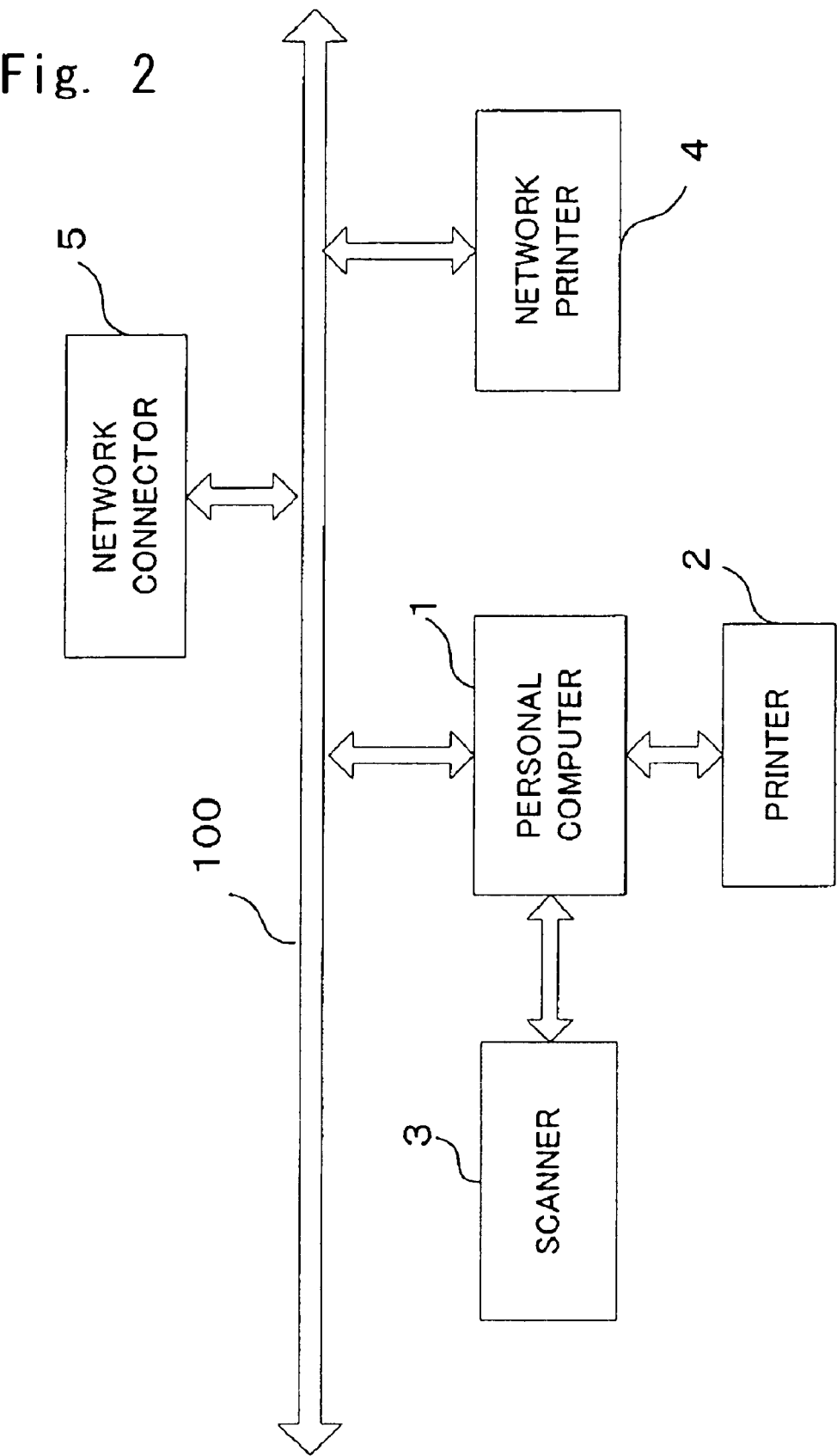
FIG. 2 is a configuration diagram showing a system environment of a personal computer in the first embodiment of the invention.
Figure 3:
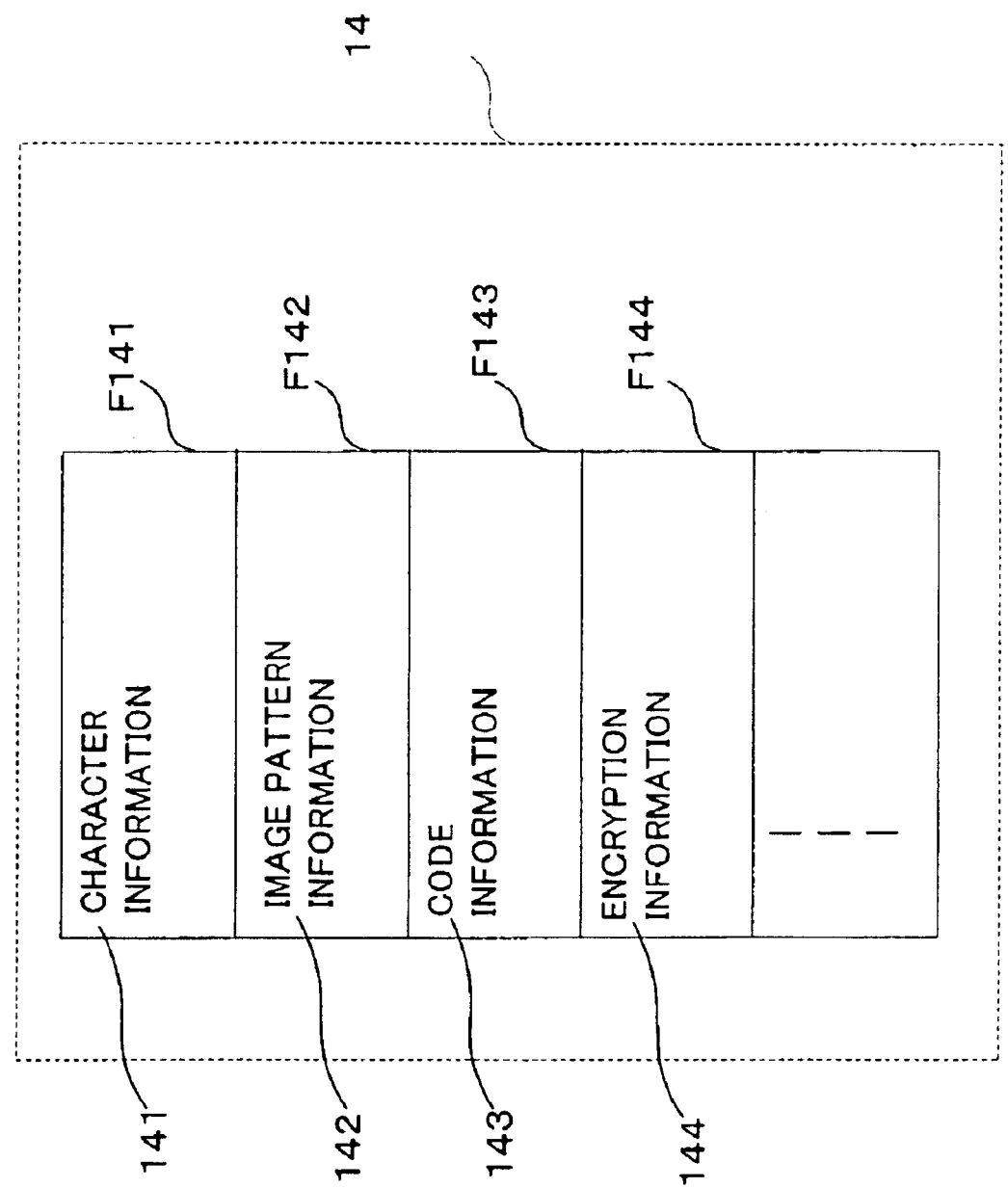
FIG. 3 is a diagram showing copy inhibition information in the first embodiment of the invention.
Figure 4:
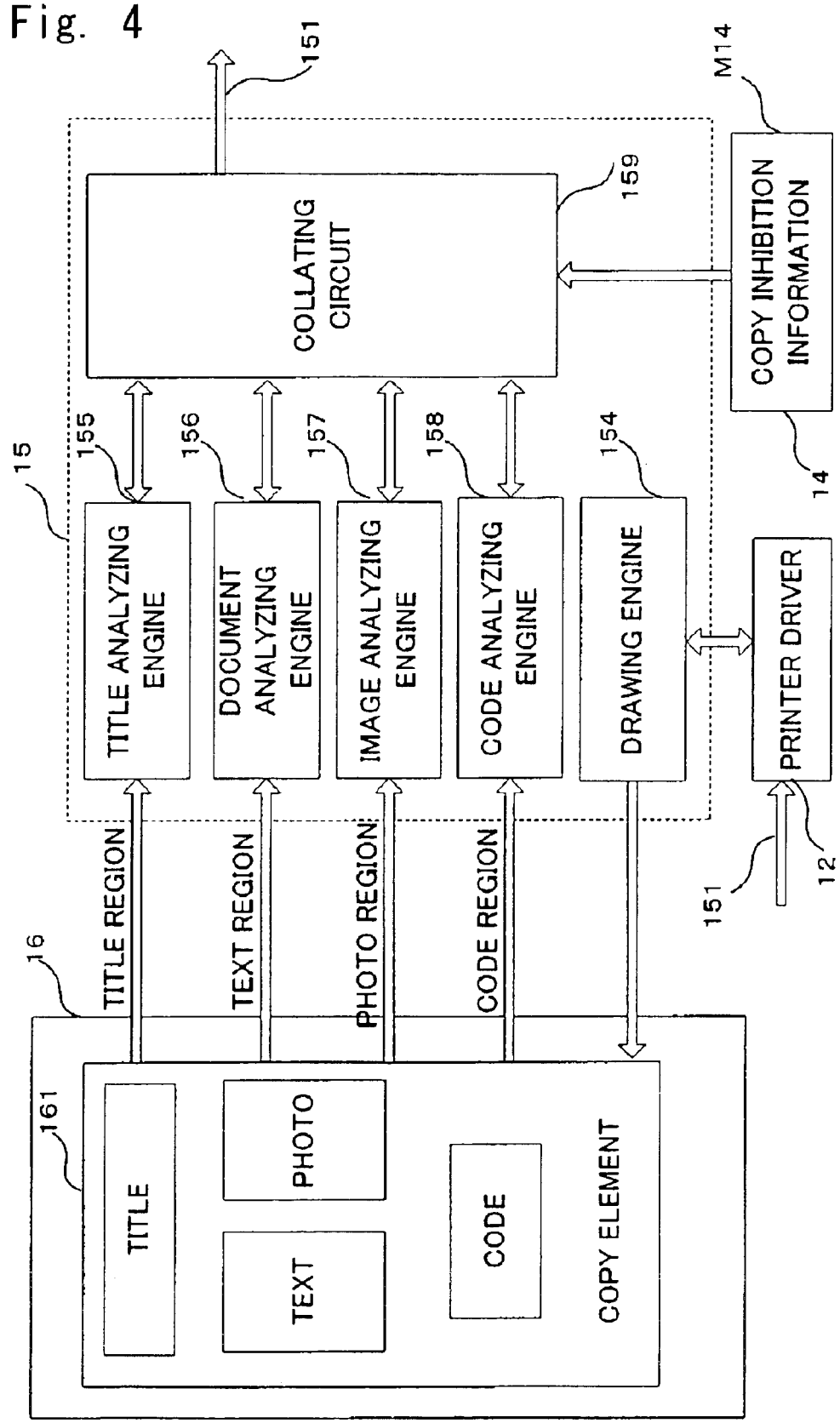
FIG. 4 is a block diagram of a printing information analyzing circuit in the first embodiment of the invention.

FIG. 1 is a block diagram showing the first embodiment of the invention. FIG. 2 is a block diagram showing a configuration of the system environment of a personal computer. FIG. 3 is a diagram showing an example of inhibition information described hereafter. And FIG. 4 is a block diagram showing in detail a part shown in FIG. 1.

When a simple printing system is configured in a personal computer 1 (which will be described as PC1 hereafter) by installing various applications as shown in FIG. 2, it is possible for the PC1 to perform the editing and the image processing (color processing). When a scanner 3 is selected as inputting means, image data is read by the scanner and then imputed in the PC1. A printer 2 as copying means produces a printing image on a recording paper, an OHP paper or the like in accordance with the printing data of the PC1.

When the PC1 is connected with a network 100, the image data may be read by a network scanner 5, and the printing data may be transferred to a network printer 4 and printed thereby.

The DTP system comprises the scanner 3 for inputting an object original to the PC1 as described above, the PC1 for the color or other processing of images read by the scanner, and the printer 2 for printing the image. In addition, it is needless to say that the object image may be graphics data prepared by an application installed in the PC1 instead of the images read by the scanner.

Next, the operation that the PC1 prints specific printing data 11 is explained here referring to FIG. 1.

FIG. 1 is a functional block diagram in case where the PC1 works under a specific printing application. The image data, which is inputted from outside through the scanner and etc. or prepared inside of the PC1 by an application for the image preparing, is stored as a printing data 11 in a printing information memory M11. Under these conditions, when a user selects the printing, the printing data 11 is sent to a printer driver 12. At this time, since the printing information memory M11 is predetermined to be a working memory, there are some cases that the printing data 11 stored in advance in a hard disk is given to the working memory, the printing data 11 inputted from the scanner is given direct to the working memory, or the like.

The printer driver 12 has been previously installed as a control program for handing data from the PC1 to the printer 2. The printer driver 12 transfers to the printer 2 the printing data 11 selected to be printed by the application.

In FIG. 1, data monitoring means comprises printing information analyzing circuit 15 and an inhibition information memory M14 storing copy inhibition information 14. Besides, the inhibition information memory M14 is given on demand copy inhibition information from inhibition information storage 300 that will be described later. The copy inhibition information 14 may be anything that can specify the printing information aiming at every printing matter such as documents, bank bills, securities, and cash vouchers. The kind of the copy inhibition information is not restricted to one kind, but there are various kinds as described later. And the inhibition information memory M14 are a working memory like the printing information memory M11.

The printing data 11 is given to the printer 2 from the printer driver 12, and also given to the printing information analyzing circuit 15 composing the data monitoring means 400. The printing information analyzing circuit 15 expands on a confirmation memory M16 copy elements, such as character string information described in the metalanguage, image pattern information, code information, and encryption information embedded by the digital watermark method of the printing data 11 to be transferred to the printer 2. The expansion in this stage does not mean that of bitmap data, but that of data in a form printable by a printer. For instance, the copy elements may be expanded to the intermediate language like a displaying list, or to the state of ASCII code of characters. Besides, the code information means a specific pattern corresponding to a code (a number, a mark, and so on) that is decoded to the number or the code by the code analyzing engine described later.

Moreover, the printing information analyzing circuit 15 collates and analyzes the copy elements of the expanded printing data 11 with the copy inhibition information 14 stored in the inhibition information memory M14 (which will be described later in detail). When determining that the copy element of the printing data 11 agrees with one of the copy inhibition information 14 previously stored in the inhibition information memory M14, the printing information analyzing circuit 15 outputs a stop order 151 to the printer driver 12 in order to stop transmitting the printing data. According to the stop order 151, inhibiting means 121 provided with the printer driver 12 stops transmitting the printing data to the printer 2.

Therefore, the above method can prevent the unauthorized copying in the step that the printing data passes through PC1.

It is arranged in the invention that the contents of the copy inhibition information 14 can be updated corresponding to the contents to be inhibited from the printing. Thereby, the invention can accommodate to the secrecy management level and the secrecy information that are updated day by day, and also to the forgery preventing technology and the encrypting technology of which the technology development is rapidly advancing.

That is to say, while information updating circuit 13 including functions of updating means and obtaining means has registered in advance an ID of person having a right to update, an IC card 200 registers the same ID representing the person having the right to update. Under this condition, it is arranged that the information updating circuit 13 may authenticate the IC card 200 when the IC card 200 is inserted into card reading means of the PC1.

At this time, if it is authenticated that the person having a right to update is going to update, the copy inhibition information 14 obtains updating data stored in the IC card 200 and is updated from the contents previously stored in the inhibition information storage 300 such as a hard disk to that data (there is a case where contents are written in newly).

Besides, the updating of the IC card 200 itself is executed by a sever device (a copy inhibition information registering device 6 shown in FIG. 12, for example) storing information to be a master of the copy inhibition information 14 (master inhibition information) and a separated PC working the server device or the like. At the time of updating the IC card 200, the date (or the version of the updated contents) is registered in the IC card as the updating log. On the other hand, when the contents of the inhibition information storage 300 is updated according to the IC card, the date (or the version of the updated contents) is also registered in the inhibition information storage 300. And then it is preferable that the information updating circuit 13 updates the contents of the inhibition information storage 300 when the date of the IC card is later than that of the inhibition information storage 300. Thereby, it is possible to avoid the unnecessary updating (see the fifth embodiment).

It is needless to say that the updating data may be obtained passing through the network 100. That is to say, a server device (the copy inhibition information registering device 6 shown in FIG. 11, for example) for storing master inhibition information to be original information of the copy inhibition information 14 should be provided on the network. Under this arrangement, the information updating circuit 13 accesses to the server device on the network on demand or at fixed periods and then obtains the master inhibition information from the server device (see the fifth embodiment).

Besides, even when the copy inhibition information is obtained through the network as described above, it is preferable that the inhibition information storage 300 may store only the latest information by comparing the data or the like of the updating of the original information on the server device with the date or the like of the latest updating of the copy inhibition information stored in the inhibition information storage 300.

Moreover, by presetting IDs of persons having a right to update in the server device, it is arranged that an instructor of the updating is judged to be an authorized person or not according to each individual ID sent via network. That is to say, the information updating circuit 13 transfers the information for the updating-right registered in the IC card to the server device together with the user ID, when a person without the right requests the updating, the master inhibition information (copy inhibition information) is not transmitted to the PC side. However, unlike the above case, the copy inhibition information is not necessary to be written into the IC card used here.

Since the invention includes the function of updating as described the above, it is possible to perform the updating of copy inhibition information easily, and to maintain that the contents be the latest edition. In addition, since there is no necessity for changing a built-in memory (ROM), the updating can be performed quickly and it is possible to prevent the spread of the unauthorized copying.

Moreover, by performing the authentication of a person with the updating-right, it is possible to guard the data from persons making the unauthorized copying or the illegal change.

The copy inhibition information 14 obtained as above are stored in the inhibition information memory M14 from the inhibition information storage means 300 at the time of copying, which is shown in FIG. 3.

A field F141 of the inhibition information memory M14 stores character information 141 such as a title in a document, specific character strings in a document (for example, a significant keyword of a confidential document or the like), and etc. A field F142 stores image pattern information unique to and specifying the printing information. For instance, when a specific pattern (or a character string) is corresponding to a specific code, the association information between the pattern (or the character string) and the code are stored.

In addition, A field F144 stores encryption information 144 like decryption information of digital watermark embedded in photo image data protected by the copyright, and decryption algorithm of encryption pattern and type information of code, which are previously printed on originals to be read by a scanner 3 according to a specific encryption (security printing, etc.).

It is possible to accommodate these copy inhibition information 14 to every document and every original by adding with necessary information. Additionally, the copy inhibition information 14 is also able to apply to a case where a displaying device is used as outputting means instead of the printer.

For instance, when the data monitoring method of the invention is applied to the displaying system using a display like CRT and so on, it is enough that specific figures, codes or the like embedded in still images or moving images to be inhibited from the browsing (copy) may be added as new copy inhibition information to each prescribed one.

Next, it is arranged as shown in FIG. 4 that printing information analyzing circuit 15 always monitors the printer driver 12 and never fails to work specific operations before starting the printing.

First, when the printing information analyzing circuit 15 starts the operation, a drawing engine 154 acquires copy elements composing the printing data 11 from the printer driver 12 and draws each copy element into a confirmation memory M16. In this way, each copy element 161 drawn into the confirmation memory M16 is analyzed in its content by each analyzing engine.

That is to say, out of copy elements 161 of object data (printing data 11) expanded on the confirmation memory 16, title data is extracted by a title analyzing engine 155, and the result of the analyzed contents is transmitted to a collating circuit 159. The collating circuit 159 selects character information 141 usable as collation information out of copy inhibition information 14 stored in the inhibition information memory M14, which are collated with analyzed result transmitted from the title analyzing engine 155. In a result of the collating, if agreeable information is found, it is considered that the unauthorized copying is executed; thereby the stop order makes the printer drive 12 stop the printing.

There are many methods for extracting titles by the title analyzing engine, however, the title analyzing engine regards and extracts regions gathering large sized characters in the object data as a title in general.

Likewise, a document analyzing engine 156 extracts text data from copy elements expanded on the confirmation memory M16, and then transmits said data to the collating circuit 159. And an image analyzing circuit 157 extracts a part of photo from the copy elements expanded on the confirmation memory M16, and then transmits said data to the collating circuit 159. In addition, a code analyzing circuit 158 extracts specific codes (numerical values, symbols) by decoding the copy elements expanded on the confirmation memory M16, and then transmits said data to the collating circuit 159.

The collating circuit 159 selects character (text) information 141, image pattern information 142, code information 143, and encryption information 144, such data usable as the collating information, out of the copy inhibition information 14 respectively. And respective information is collated with the analyzed result transmitted from each analyzing engine. In a result of collating, when the printing information that agree with any one of the copy inhibition information is found, it is consider the unauthorized printing, thereby the stop order 161 makes the printer driver 12 stops the printing.

In the steps of the above collating, the collating circuit 159 in response to inquiries from each analyzing engine may acquire necessary information out of the copy inhibition information 14 and response to each analyzing engine. For instance, the code analyzing engine 158 requires decoding algorithm and the key at the time of decoding. For that reason, the code analyzing engine 158 asks the collating circuit 159 about the decoding algorithm necessary for the decoding, and then obtains the latest decoding algorithm from the inhibition memory M14. Thereby the code can be decoded, When a specific code is converted to regular information, it is necessary for the association of the code and the corresponding regular information. In this case, the collating circuit 159 obtains the association from the inhibition memory 14, and then gives said data to the code analyzing engine 158.

As described above, the invention can accommodate to the printing originals with various kinds of characteristics by a plurality of analyzing engines.

In addition, the invention can be made more effective by providing the data monitoring device of the invention with a secrecy management function.

The secrecy management function through network will be described in the seventh embodiment. Here is described regarding the secrecy management function executed by the data monitoring device.

That is to say, secrecy management information 67 indicating a secrecy management level has been imparted to each copy inhibition information as shown in FIG. 13, for example (the explanation about FIG. 13 will be made in the seventh embodiment). On the other hand, the secrecy management level has been imparted to a user of the PC1 together with the user ID, of which content was registered in an IC card 500, for example. Under these conditions, when a user uses the PC1, the user makes a secrecy management circuit 68 read the IC card 500. The secrecy management circuit 68 sends the readout content to prevention canceling means 17. When the copy elements of the printing data 11 are expanded on the confirmation memory M16 as described above, the prevention canceling means 17 judges if the user has a right to copy and browse the copy elements, referring to the secrecy management information 67 of copy elements being analyzed by the printing information analyzing circuit 15. As the result, if the user is judged to have a right to copy and browse, the inhibition processing of the printing information analyzing circuit 15 is canceled.

Therefore, it is possible to prevent the printing information analyzing circuit 15 from working even in case where there is no need to inhibit the copying or the browsing.

Beside, the IC card 500 may be common to an IC card registering the right of updating, however, it is preferable that the right of updating may be treated as the data different from the secrecy management level. It is needless to say that the secrecy management processing can be applied to a printer and a scanner that are described as follows.

In the first embodiment as described the above, since the PC1 is provided with the function of preventing the unauthorized copying by analyzing the printing contents when the PC1 instructs the printer to print out, it is possible to previously prevent the unauthorized copying of secrecy documents in companies, and the forgery of bank bills and cash vouchers. In addition, since the invention is provided with a configuration that can update the copy inhibition information in easy, the invention can cope with the secrecy management level and the secrecy information that are changed day by day, and the technologies of the forgery prevention and the encryption that progress rapidly. Consequently, it is possible to prevent the spread of the unauthorized copying.

Moreover, it is possible to prevent any person from changing information or performing the unauthorized copying by authenticating and confirming if the person has a right to update. And since the management level can be imparted, the management of the secrecy information can be carried out in various levels.

Furthermore, when the preventing function of the unauthorized printing is provided to the personal computer, there is no need for any special hardware, but to install software only. Therefore, it is possible to cut cost.

Embodiment 2

The first embodiment refers to a case where the personal computer is provided with the preventing function of the unauthorized copying, meanwhile the following explanation will describe the embodiment wherein a printer is provided with the preventing function of the unauthorized copying.

Figure 5:
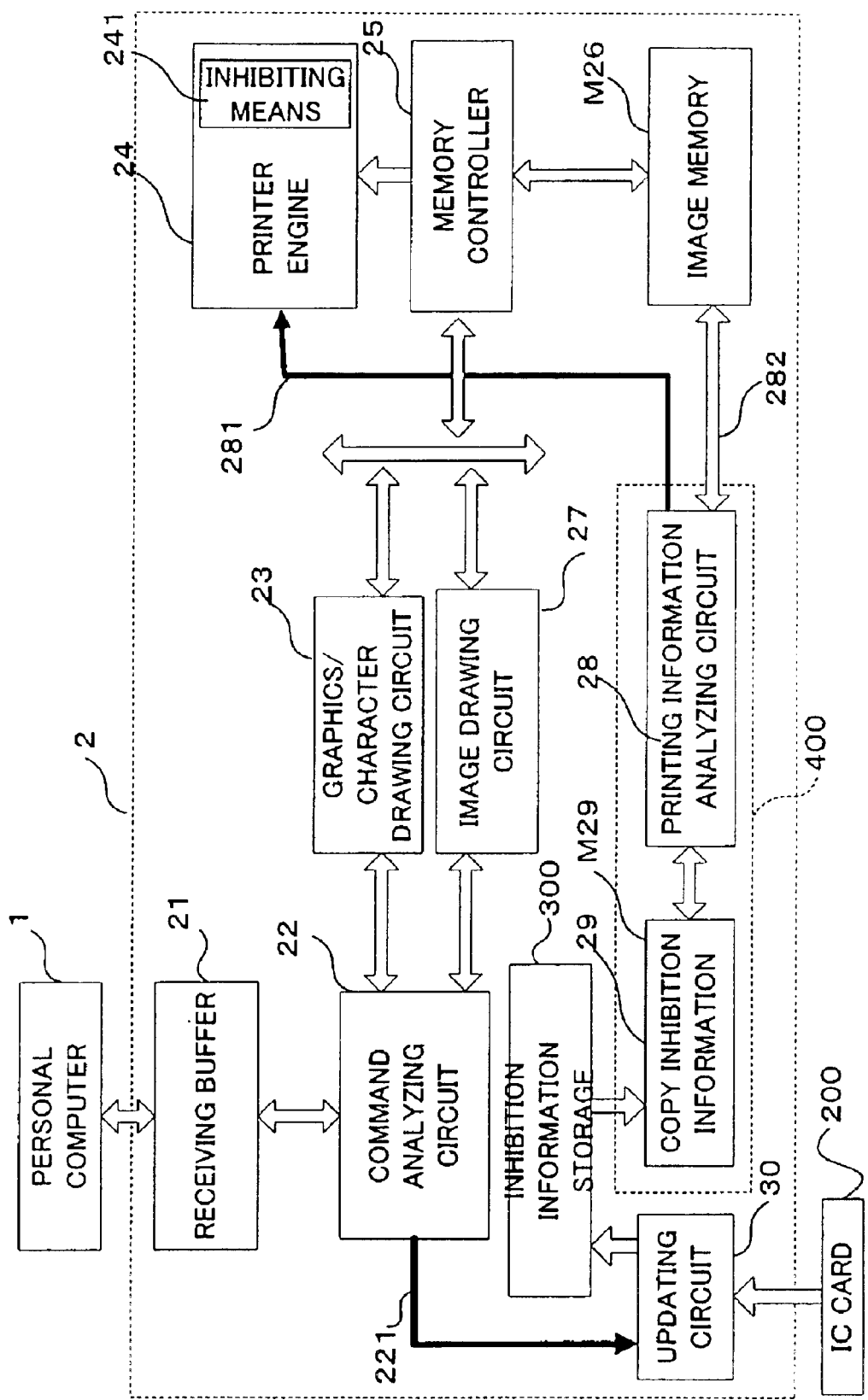
FIG. 5 is a block diagram of a printer in the second embodiment of the invention.

The operations of a printer 2 will be explained referring to FIG. 2 and FIG. 5. FIG. 5 is a block diagram of the printer 2.

A receiving buffer of the printer 21 receives printing data from the PC1, and the printing data is transmitted to a command analyzing circuit 22 one after another. The command analyzing circuit 22 analyses the language and the image data format of the received printing data. Next, in a result that the command analyzing circuit 22 performs the analyzing, if it is necessary for drawing characters and graphics, the printing data is sent to a graphics/character drawing circuit 23. The graphics/character drawing circuit 23 draws the specific graphics and characters on an image memory M26 via memory controller 25. Likewise, in a result that the command analyzing circuit 22 performs the analyzing, if it is necessary for expanding photo data, the printing data is sent to an image drawing circuit 27. The image drawing circuit 27 expands the specific photo data on an image memory M26 via memory controller 25. When the expansion of the desired image data is formed on the image memory M26, the memory controller 25 transmits the image data to a printer engine 24. The printer engine 24 prints on recording papers according to the received image data.

In FIG. 5, the data monitoring means 400 comprises an inhibition information memory M29 including a printing information analyzing circuit 28 and copy inhibition information 29.

The printing information analyzing circuit 28 composing the data monitoring means 400 monitors image data expanded on the image memory M26 as mentioned above, and analyses the contents of the image data before the image data is transmitted to the printer engine 24. If the contents of the image data agree with the information stored in the inhibition information memory M29, a stop order 218 is outputted. When receiving the stop order 218, inhibiting means 241 provided in the printer engine 24 stops the operation of the printer engine 24.

Next, the function of an updating circuit 30, since that as the updating means is almost same as that explained in the first embodiment, will be explained hereafter regarding the different points from that of the first embodiment. Besides, the inhibition information memory M14 and the information updating circuit 13 in the first embodiment are corresponding to a inhibition information memory M29 and a information updating circuit 30 respectively. Although the inhibition information storage 300 may be a hard disk, it may be preferable to be a rewritable nonvolatile memory with small capacity like a flash-memory because there is not so much large size of data to be stored in the printer.

The steps of the updating by the IC card 200 are same as that in the first embodiment. And the updating data may be obtained from the PC1. At any time, at the fixed period, at the unfixed period, or at the time of the printing, the PC1 transmits to the printer 2 the updating data together with the printing data. The updating data is received by the command analyzing circuit 22 passing through the receiving buffer 21. At this time, the command analyzing circuit 22 detects updating data 221 from the order codes defined aside from the printing data, and transmits the updating data 221 to a updating circuit 30.

The updating data obtained from the PC1 may be either one of that the PC1 received passing through the network 100, or that the PC1 received from a removable recoding medium. In this case, the confirmation of the update-right should be performed by the PC1 side.

Besides, the contents of the copy inhibition information 29 used in this embodiment is quite same as that of the copy inhibition information 14 explained in the first embodiment, of which explanation will be omitted here.

Figure 6:
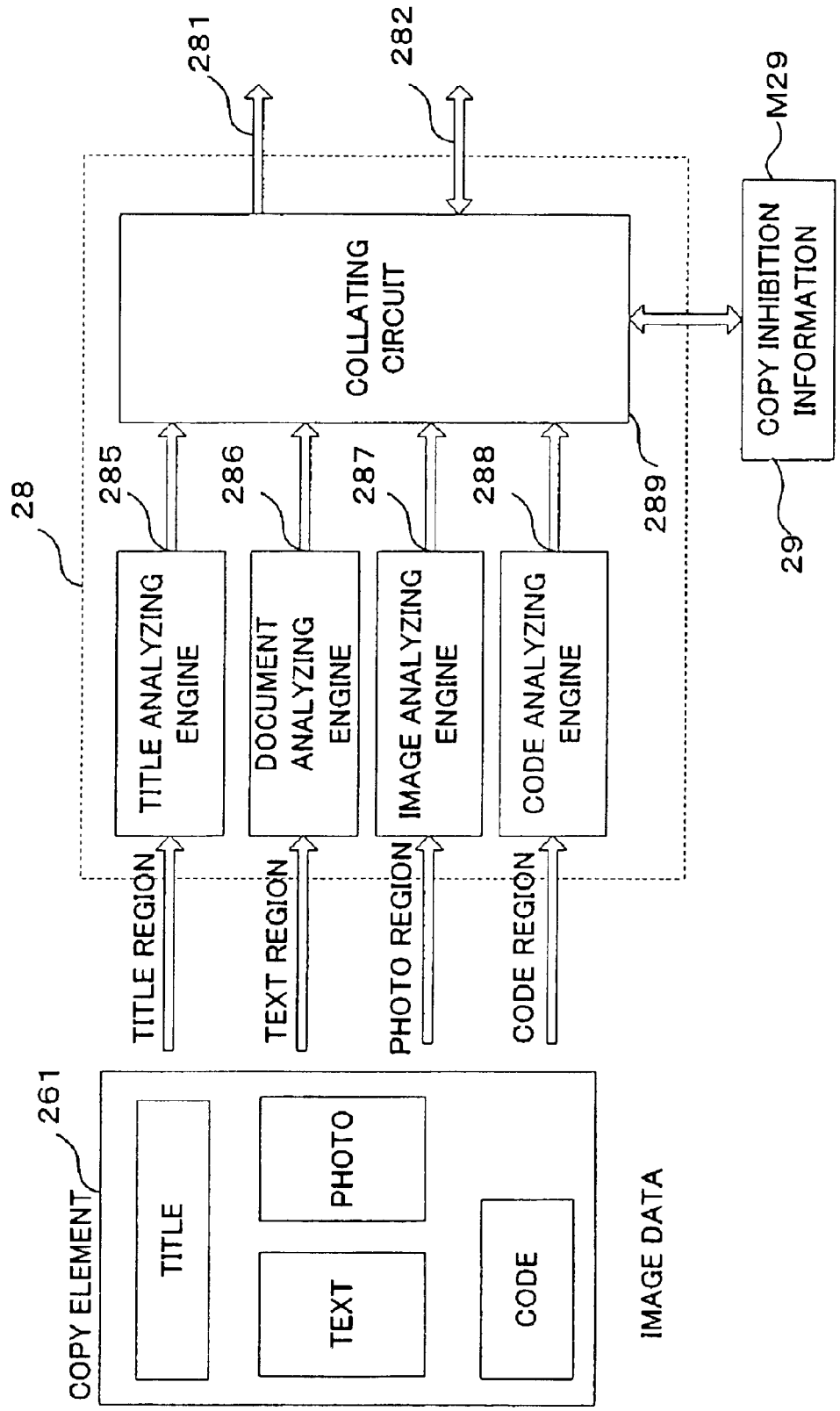
FIG. 6 is a block diagram of a printing information analyzing circuit in the second embodiment of the invention.

Next, a printing information analyzing circuit 28 shown in FIG. 6 is almost same as the printing information analyzing circuit 15 shown in FIG. 4. The processing within the PC1 needs to expand the printing data sent from the printer driver 12 on the confirmation memory M16 by the drawing engine 154 as described in the first embodiment, on the other hand, it is arranged in this embodiment that the printing data transmitted from the PC1 be expanded on the image memory M26.

As described above, the processing after the step of expanding the printing data is same as that of the first embodiment except that the reference numerals of circuits differ respectively.

The effect based on the above configuration is also same as that in case where the invention is applied to the prescribed PC, however, the moving picture cannot be regulated by the copy inhibition. Merely, it is possible to activate each prescribed engine whenever each frame of moving picture is printed out by the printer.

Embodiment 3

The second embodiment refers a case where the data monitoring function should be installed into the printer to prevent the unauthorized copying, meanwhile the followings will explain the embodiment where the data monitoring function is installed to a scanner.

Figure 7:
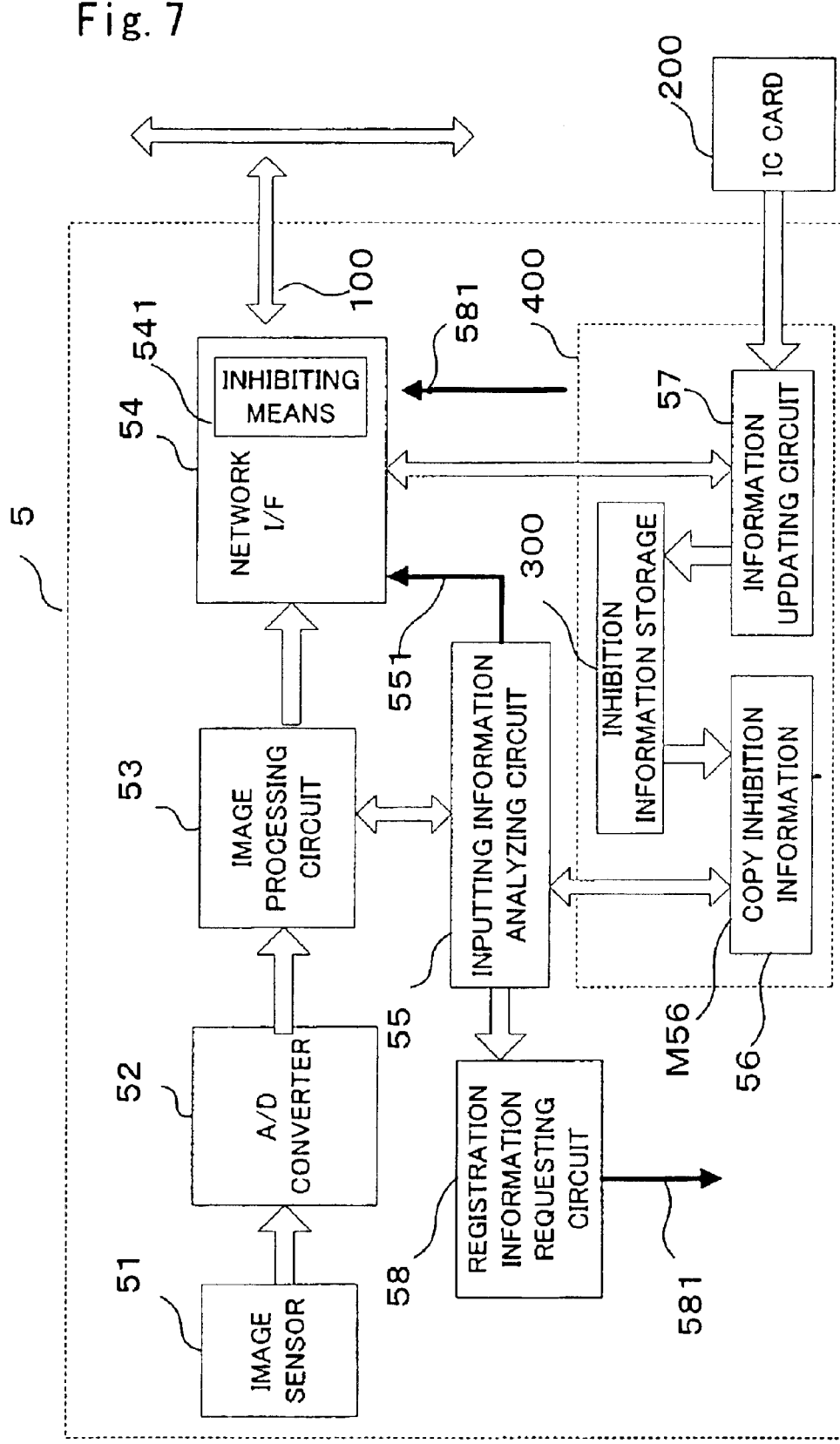
FIG. 7 is a block diagram of a network scanner in the third embodiment of the invention.

The operation of a network scanner 5 will be explained according to FIG. 7. FIG. 7 is a block diagram of the network scanner 5.

An original being an object (not shown) is read by an image sensor 51, which is converted to digital image data by an A/D converter 52. The image data is transmitted toward the network passing through a network interface 54 (which will be described as a network I/F 54 hereinafter) after the image processing like the edge emphasizing to emphasize edges of characters in the image or the color processing by image processing circuit 53.

The data monitoring means 400 comprises inhibition information memory M56 including an inputting information analyzing circuit 55 and copy inhibition information 56. The inputting information analyzing circuit 55 composing the data monitoring means 400 judges if the original is inhibited from the printing according to the information stored in the copy inhibition information 56. When it is detected that the original is inhibited one, a stop order 551 is outputted to the network I/F 54. At receiving the stop order 551, inhibiting means 541 provided in the network I/F 54 stops the output of the image data.

The copy inhibition information 56 stored in the inhibition information memory M56 is the same as the copy inhibition information 14 shown in FIG. 3, of which explanation is omitted here. Besides, the copy inhibition information 56 can be updated by an information updating circuit 57 in the same steps described in the first or the second embodiment. The updating steps by the information updating circuit 57, as explained in the first or the second embodiment, may obtain the updating information form other devices connected with network passing through the network I/F 54, otherwise can obtain the updating information from a removable IC card 200 or a memory card. Besides, as described in the second embodiment, a hard disk may be used as the inhibition information storage 300, but it may be preferable to use a rewritable nonvolatile memory with small capacity like a flash-memory because there is not so much large size of data to be stored in the network scanner.

However, this embodiment is considered from a case where the copy inhibition information is obtained directly from a server (master information storage means) on the network without using a hard disk or a flash-memory.

Figure 10:
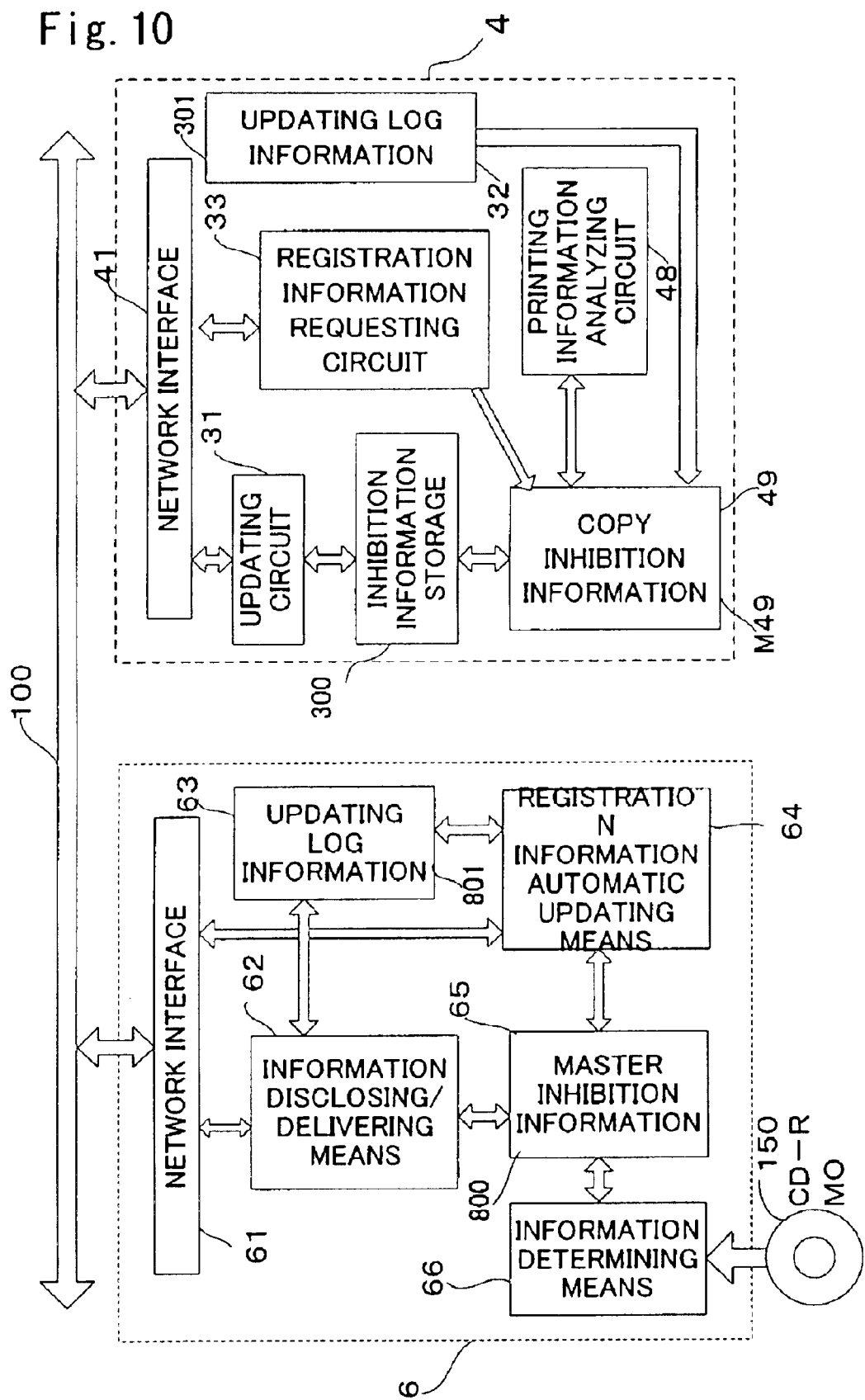
FIG. 10 is a block diagram of a copy inhibition information registering device in the fifth embodiment of the invention.

The scanner 5 is provided with a registration information requesting circuit 58 (information obtaining means), on the other hand, the network is provided with a server device (the copy inhibition information registering device 6 shown in FIG. 10, for example) that stores original information of the copy inhibition information 56 (which has the same contents as the copy inhibition information 56) as explained in the fifth embodiment. Thereby, the copy inhibition information 56 can be obtained via network by the registration information requesting circuit 58. Therefore, since it is not necessary for installing a memory for storing huge information, it is possible to reduce the cost of the products.

It is supposed that the server device on the network is set up either one of the specific business places. In this case, it is arranged that the inputting information analyzing circuit 55 activates the registration information requesting circuit 58 automatically at the time of reading originals and then accesses to the server device to obtain the necessary copy inhibition information 56. The copy inhibition information 56 is stored directly in the inhibition information memory M56 that is a working memory in the network scanner instead of storing a hard disk or the like, wherein the data is provided to the comparing and the collating of the inputting information analyzing circuit 55.

It is needless to say that the registration information requesting circuit 58 can be adapted to the personal computer in the first embodiment, or the printer in the second embodiment.

Besides, it is a matter of course that the scanner of this embodiment is applied to not only a scanner connected with the PC1 via network but also a scanner connected direct with the PC1.

As described in the above third embodiment, the network scanner 5 does not need to install a memory to store huge information because the registration information requesting circuit 58 can obtain the same contents as the copy inhibition information 56 via network. Therefore, the invention is useful for any device that is not usually provided with a hard disk, such as a printer, a scanner, or the like.

The device provided with the inhibition information storage 300 updates the contents of the inhibition information storage 300 according to the information obtained from the IC memory 200 or via network, of which the effect is the same as that of the first and the second embodiment, therefore the explanation will be omitted here.

Embodiment 4

The third embodiment refers to a case where the data monitoring function is installed into a scanner; meanwhile this embodiment explains a case where a network printer comprises the data monitoring function.

Figure 8:
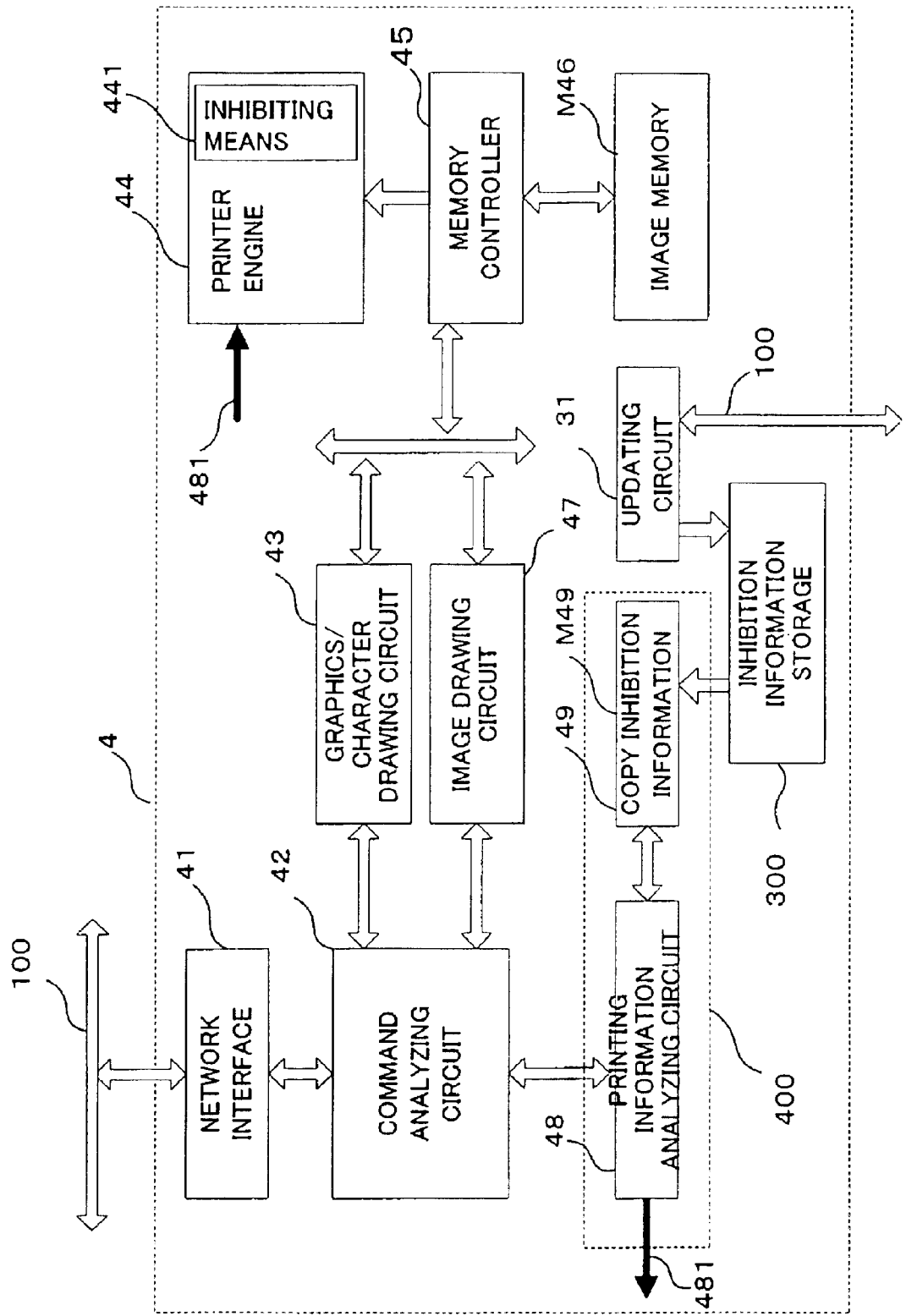
FIG. 8 is a block diagram of a network scanner in the fourth embodiment of the invention.

FIG. 8 is a block diagram of a network printer 4.

The network printer 4 receives printing data from a device connected with the network. A command analyzing circuit 42 receives the printing data and sends the instruction command via network interface 41 (which is called a network I/F 41 hereunder), and analyses the language and the image data format of the received printing data. In addition, the command analyzing circuit 42, a graphics/characters drawing circuit 43, an image drawing circuit 47, and a memory controller 45, of which reference numerals differ from that of the printer explained in the second embodiment but the functions are the same, are not explained here.

When desired image data is formed on an image memory M46, the memory controller 45 transmits the image data to the printer engine 44. The printer engine 44 prints on recording papers the image data in the order of receipt.

A printing information analyzing circuit 48 composing the data monitoring means 400 (the printing information analyzing circuit 48 and a copy inhibition information memory M49) monitors printing data interpreted by the command analyzing circuit 42, and analyses the contents of the image data before transmitting said data from the image memory M46 to the printer engine 44. If the contents of the image data agree with any one of the copy inhibition information 49 stored in the copy inhibition information memory M49, a stop order 481 is outputted. At receiving the stop order 481, the inhibiting means 441 provided in the printer engine stops the operation of the printer engine 44. It is needless to say that, like the second embodiment, the printing information analyzing circuit 48 may monitor and analyze the image memory M46.

Next, like the updating circuits 30, 31, or 57 in each prescribed embodiment, an updating circuit 31 can update the content of the copy inhibition information stored in the inhibition information storage 300 corresponding to the content to be inhibited. The kind and the steps of the updating methods of this copy inhibition information 49 are not explained here because those are the same as the explanation in each prescribed embodiment. Besides, since the network printer is a device to be connected with the network, it is useful to update the copy inhibition information via network 100 like the third embodiment.

Embodiment 5

The first to the fourth embodiments explains about devices in which the data monitoring function is installed, on the other hand, this embodiment explains about one example of the method for delivering quickly the copy inhibition information to a device comprising the data monitoring function. That is to say, it is arranged that the PC, the scanner, and the printer described in each prescribed embodiments are to receive the delivery of the copy inhibition information concentrated on the sever device (the copy inhibition information registering device), thereby the copy inhibition information can be in common use among devices.

Figure 9:
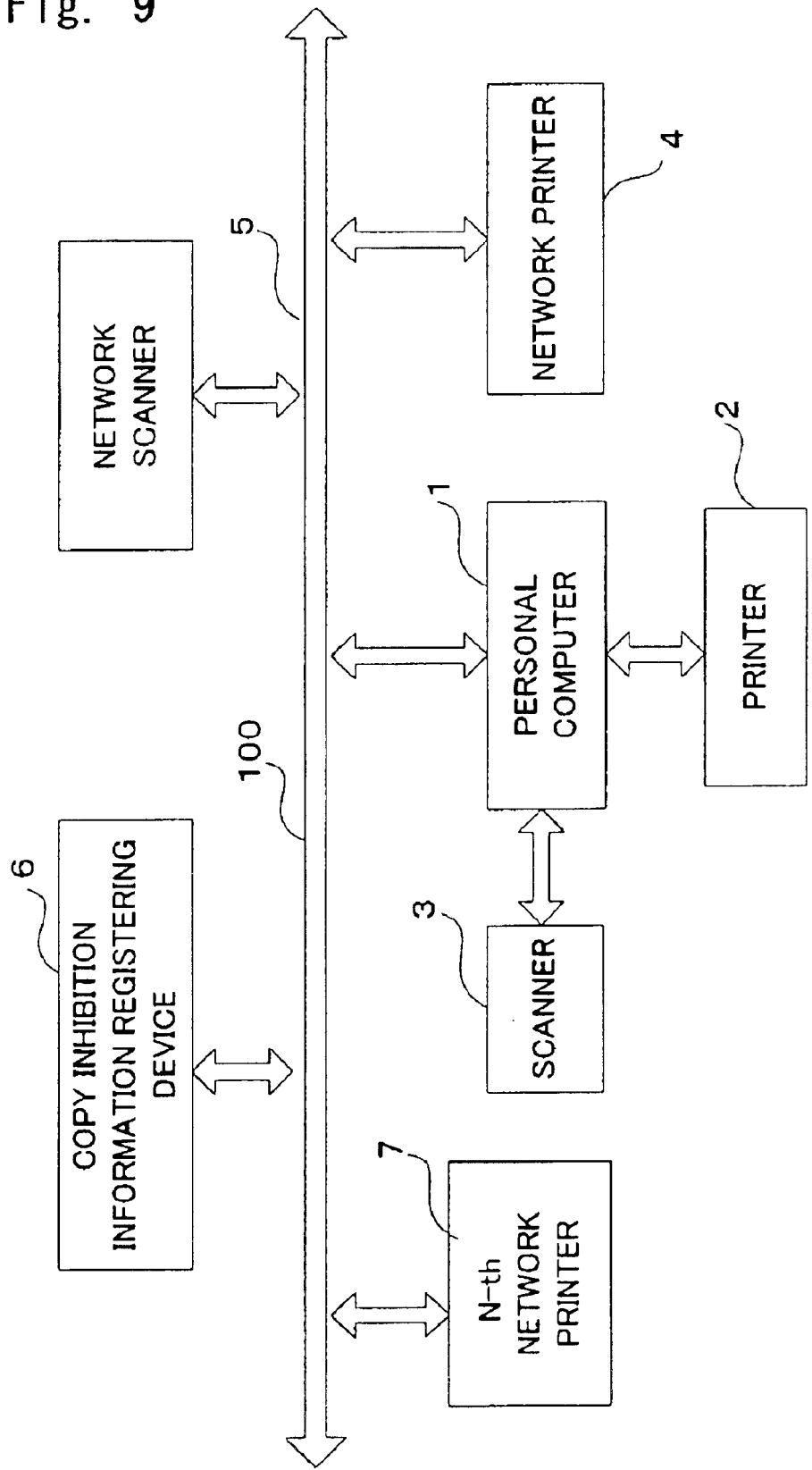
FIG. 9 is a diagram explaining a function registering on devices connected with the network in the fifth embodiment of the invention.

According to FIG. 9 and FIG. 10, the registration function of the copy inhibition information will be described. FIG. 9 is a diagram explaining the registration function on a device connected with the network. FIG. 10 is a block diagram of a copy inhibition information registering device.

In order to prevent the unauthorized copying, an important thing is how speedy the copied data being an object can be detected and be prevented from the copying. The copy inhibition information registering device 6 shown in FIG. 9 is a device delivering via network the copy inhibition information to the network scanner 5, the network printer 4, the personal computer 1, and the n-th network printer 7; those devices connected with the network.

In the preventing function of the unauthorized copying that is installed in each device, updating means installed in each device (updating means 13, 30, 31, or 57) obtains updating data from the copy inhibition information registering device 6, and then updates the contents of the copy inhibition information to the latest edition. Therefore, it is possible to deliver the information about the unauthorized copying to each device in speedy without bearing the user's load, and to prevent the unauthorized copy in advance.

The copy inhibition information registering device 6 is explained in detail according to FIG. 10. FIG. 10 is a block diagram of the copy inhibition information registering device.

In FIG. 10, information determining means 66 obtains master inhibition information 65, which are originals of copy inhibition information, from a recoding medium such as a floppy disk or CD-ROM.

The method of inputting the master information into the information determining means 66 is to input directly from a keyboard or input image patterns from a scanner, except the usage of the above-mentioned removable storage medium. The information determining means 66 obtaining the master inhibition information as above writes the master inhibition information 65 into the master inhibition information storage 800. If the master inhibition information has already written into the master inhibition information storage, the contents are written over.

Another method of updating the master inhibition information 65 is executed passing through the network 100. In this case, it is necessary to arrange in advance that registration information automatic updating means 64 may obtain updating data from a designated database. When the registration information automatic updating means 64 receives the updating data, the updating log information 63 (for example, the updating date or the version of the updating contents) is stored in the log storage 801. Thereby, the registration information automatic updating means 64 can judge whether it is necessary to update the master inhibition information 65 or not, comparing the updating date of the database on the network and the updating date of its self. The registration information automatic updating means 64 may execute the updating at regular time intervals, otherwise may execute the updating according to the notification from the database. The master inhibition information storage means 800 and the log storage 801 are sufficient to use different areas in a same hard disk respectively.

Information disclosing/delivering means 62 transfers as the copy inhibition registration information the master inhibition information 65 stored in the master inhibition information storage 800 in response to a request via network 100 (see the third embodiment). Additionally, in response to updating requests from updating circuits 13, 31 or 57 of devices controlled by the copy inhibition information registering device 6, such as a printer, a scanner, or a personal computer, the master inhibition information 65 is delivered to the updating circuits as the copy inhibition registration information.

The network printer 4 explained in the fourth embodiment is used as a device controlled by the copy inhibition registering device 6, of which embodiment is described here. When the network printer 4 receives the updating request from the updating circuit 31 via network, the information disclosing/delivering means 62 is activated and delivers the master inhibition information 65 stored in the master inhibition information storage 800 in response to the request. At the same time, the log storage 801 delivers the updating log of the master inhibition information 65 written in the master inhibition information storage 800 so far.

At receiving the master inhibition information 65, the updating circuit 31 writes the master inhibition information 65 instead of the copy inhibition information 49 previously stored in the inhibition information storage 300. At this time, the updating circuit 31 compares the updating log information 63 and the updating log information 32 stored in the log storage 301 at the previous processing, and then judges if it is necessary to update the copy inhibition information. Thereby, When the network printer 4 is activated (POWER ON) or the like, if necessary, the copy inhibition information 45 is downloaded to the inhibition information memory M49. Besides, the inhibition information storage 300 and the log storage 301 are sufficient to use different areas in a same hard disk respectively.

In addition, it is possible that the network printer 4 is provided with the registration information requesting circuit 33 (information obtaining means) like that in the third embodiment (a scanner). In a device equipped with the registration information requesting circuit 33, for example, when the printing data is expanded on the image memory 46, the registration information requesting circuit 33 requests the necessary copy inhibition information in accordance with the instruction of the printing information analyzing circuit 48, and then obtains the master inhibition information 65 stored in the master inhibition information storage 800 direct from the information disclosing/delivering means 62, and even may store the data in the inhibition information memory M49.

Therefore, since the network printer side does not need a memory for storing the copy inhibition information 49, it is possible to reduce the cost. In addition, since the copy inhibition information 49 of the network printer 4 can be updated by updating the master inhibition information 65, it is easy to control the management and it is possible to accommodate to the updating quickly.

Since the updating logs executed by the updating circuit 31 are stored in the inhibition information storage 300 as the updating log information 32, it is possible to avoid that the registration information requesting circuit 33 may issue any invalid request.

In the fifth embodiment as described above, the copy inhibition information registering device 6 can disclose/deliver the master inhibition information 65 toward each device connected with the network, it is easy to perform the maintenance and the management of devices and change levels of the secrecy information.

Moreover, by changing information of one device, the information of all the devices controlled on the network can be updated at one time; therefore it is possible to prevent the unauthorized copy speedy.

The above explanation refers to the delivery via network only, however, even when the copy inhibition information centralized in a point delivers to each device by a removable recoding medium such as an IC card (for example, the IC card 200 of the first embodiment), copy inhibition information device 6 can fulfils its satisfactory function.

Embodiment 6

Figure 11:
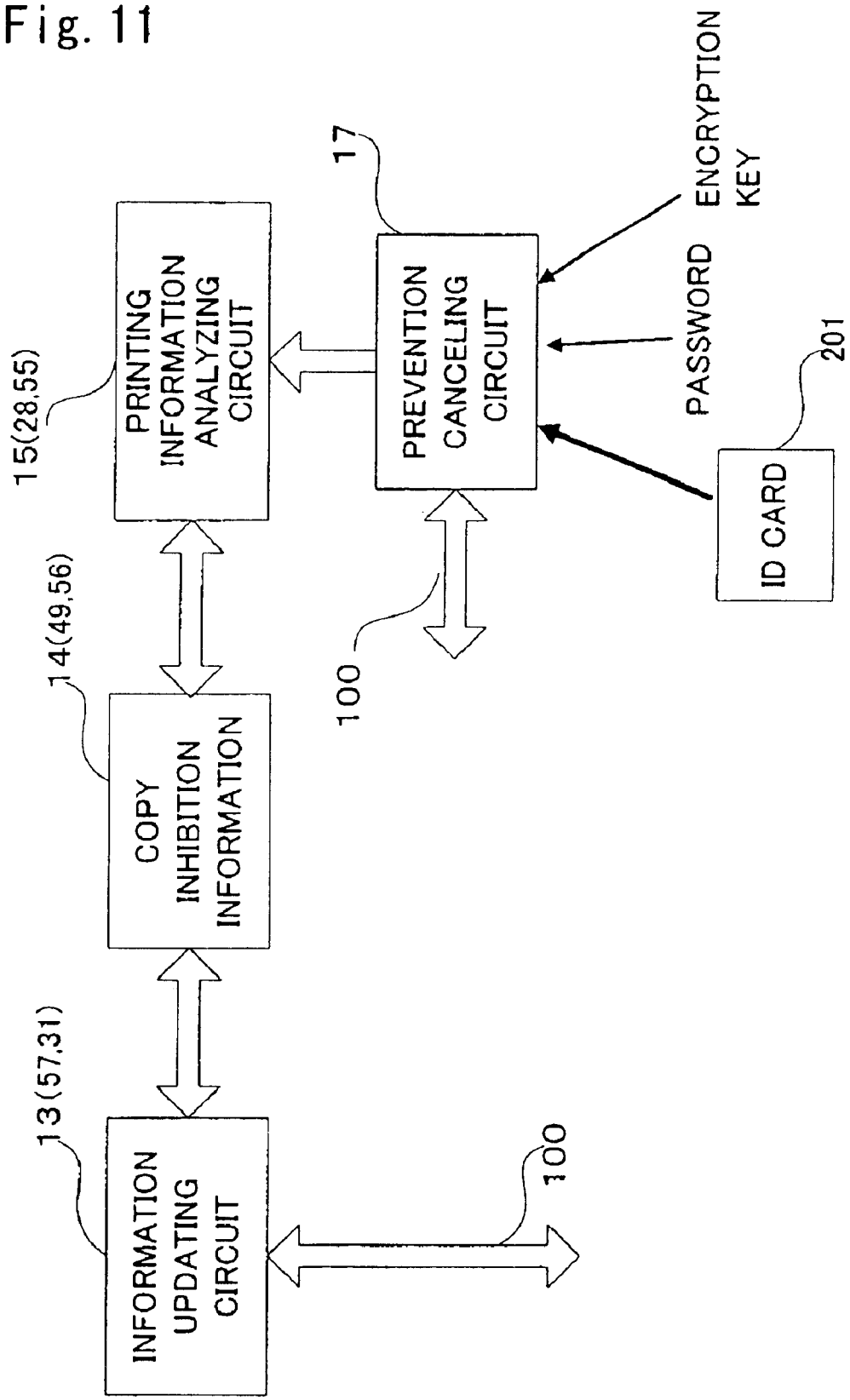
FIG. 11 is an explanatory diagram of a prevention canceling circuit in the sixth embodiment of the invention.

FIG. 11 is a block diagram showing an embodiment of a method canceling the unauthorized copy preventing function of a device comprising the data monitoring function.

For the maintenance of the device, or for some reason or others, there is a need for canceling the unauthorized copy preventing function. A user having a right to cancel the function inserts into a prevention canceling circuit 17 an IC card 201 that can executes the canceling. The prevention canceling circuit 17 authenticates the IC card 201 and then instructs the printing information analyzing circuit 15 (28, 55) to stop its function. Thereby, it is possible to stop the function preventing the unauthorized copy.

Otherwise, it may be arranged to stop the function of the printing information analyzing circuit 15 (28, 55), when a specific password is inputted from the network or a specific key of the decryption is inputted from a keyboard.

At all events, the canceling method may be a way of specifying a user having a right to cancel the function. Since the prevention canceling circuit 17 comprises a function for registering data of the authentication, such as the number of the IC card 201 and etc., from the keyboard or the network, thereby the authentication of the IC card 201 can be performed. Therefore, it is possible to accommodate to various management conditions like the change of organization, the moving of apparatuses, the change of the secrecy levels or the like.

In the sixth embodiment as mentioned above, it is possible to perform the maintenance of devcies by utilizing the prevention canceling circuit 17. Additionally, the prevention canceling circuit 17 has a function of registering the number of the IC card and etc.; thereby it is possible to carry out the flexible management.

In the first to the sixth embodiments as described as above, it is possible to prevent the unauthorized copy speedy.

Embodiment 7

Figure 12:
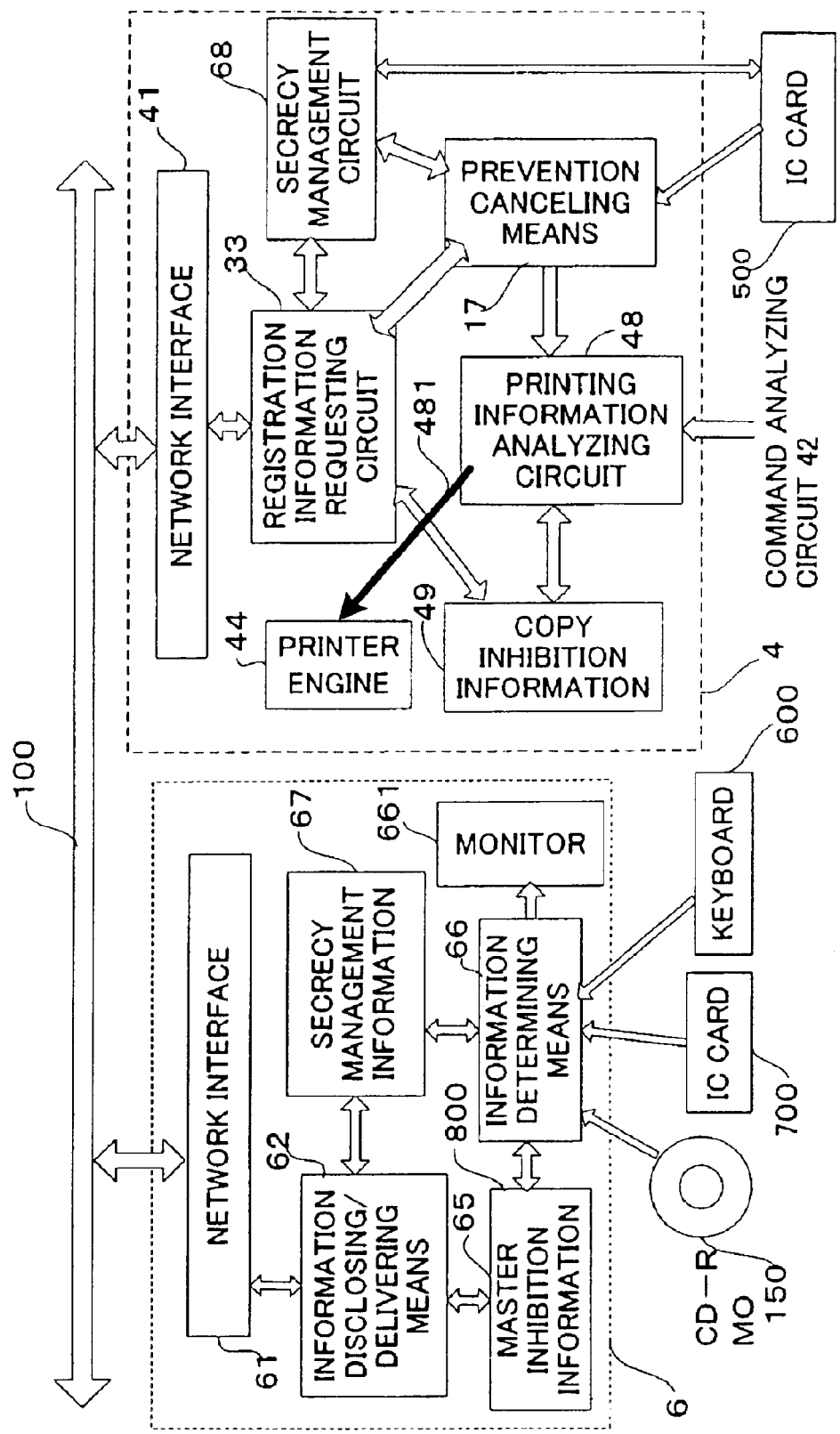
FIG. 12 is a diagram showing the seventh embodiment of the invention.

A method that a printer comprising the data monitoring function manages secrecy information via network will be described in this embodiment according to FIG. 12 and FIG. 13. FIG. 12 is a diagram explaining the management of secrecy information, and FIG. 13 is a diagram explaining the contents of the management information.

In FIG. 12, the master information storage 800 of the copy inhibition information registering device 6 is provided with secrecy management information 67 in addition to the master inhibition information 65; thereby, it is possible for the management of secrecy information to accommodate to the updating of the managed information, the limitation of allowing to display or to print for a person who accesses to the data in speedy.

Here is explained about the method of managing the secrecy information. As described in the sixth embodiment, the master inhibition information is stored in a removable recoding medium or in the master information storage 800 via network.

Under the above arrangement, a specific administrator inserts an IC card 700 to the copy inhibition information registering device 6 in order to inform that he has a right to update. Information determining means 66 of the copy inhibition information registering device 6 reads the contents of the IC card 700, and confirm whether the user has a right to update or not. If the user has a right to update, the secrecy management information 67 inputted from a keyboard 600 by using a monitor 661 is accepted.

The information determining means 66 is to write into the a table 670 shown in FIG. 13, for example, the secrecy management information 67 thus inputted together with the master inhibition information 65. That is to say, in the table 670 an information ID is for specifying the master inhibition information (copy inhibition information), a permit level explains a secrecy level represented by alphabet and numbers; each alphabet indicates the secrecy level raising in the alphabetical order and respective numerals following to the alphabet indicates the secrecy level raising in the order of numbers. And the group ID indicates a control department of the master inhibition information, and an individual ID is for identifying a user. Therefore, for instance, regarding the master inhibition information (copy inhibition information) D001, the output of the information will be allowed for a user having a permit level over the A001 and included in X00. And it is defined that the copying and the browsing are allowed for the user having the individual ID of ID1/PW1 in addition to the above conditions.

The secrecy management information 67 thus inputted is referred by secrecy management circuit 68 on the printer 4 side. Specifically, a user inserts an IC card 500 into the secrecy management circuit 68 before using the printer 4.

The secrecy management circuit 68 reads the contents of the IC card 500 and stores the secrecy management level registered in the IC card such as the permit level, the group ID, and the individual ID together with the user ID.

Next, when receiving specific printing data from the PC and so on and expanding said data on the image memory M46 (see FIG. 8), as described in the fifth embodiment the registration information requesting circuit 33 obtains the copy inhibition information 65 via network interface 41 and stores said data in the inhibition information memory M49 while obtaining the corresponding secrecy management information 67 from the table 670 and sending the data to inhibition canceling means 17. The inhibition canceling means 17 compares the secrecy management level 67 corresponding to the copy elements in the printing information analyzing circuit 48 being an object of the collating and the secrecy management level of the user stored in the secrecy management circuit 68. When the secrecy management of the user is higher than that of the secrecy management information 67, the printing information analyzing circuit sends to a printer engine 44 a signal 481 that the user is an allowable person; thereby the desired printing matter can be obtained.

If the user is an unallowable person, the instruction of the canceling is not sent to the prevention canceling means 17 meanwhile the inhibition of printing the specific information is set. With reference to the copy inhibition information 49, the printing information analyzing circuit 48 issues the signal 481 for specifying the inhibition object and then stops the printer engine 44.

As mentioned above, it is possible to accommodate speedy to the updating day by day since a device comprises the function registering the management information of secrecy information. Additionally, it is possible to carry out the precise control of the copying and the browsing in association with the registering device of the secrecy information by providing the secrecy management function with the printer 4. It is also possible to carry out the detailed configuration of the information disclosing operation, like the level controlling of the copying and the browsing per each title group according to the permit level, per position or organization according to the group ID, or per specific person according to the individual ID. When the registering device is provided on the network, if there is any change of organization or change of layout, it is possible to carry out the secrecy management speedy. It is better that managing items, such as device information to be inhibited from output, the information of the management period, and etc., are arranged to be extendable at any time.

Besides, the method of the individual authentication may adopt the recognition of a fingerprint of hand, a face, or a retina of eye instead of the IC card 500, any method of which can specify an individual can be applied to this invention.

Moreover, the invention is explained taking the printer as an example, however, it is possible to prevent the undesired disclosing of the secrecy information by providing the data monitoring function of the invention with a displaying device and adding the secrecy information management function to each device.

Furthermore, the invention can be applied to a displaying device of every portable intelligent terminal such as a Personal Digital Assistance (PDA), a mobile phone, a notebook-type computer and etc. without limiting to a displaying device of a specific personal computer.

Furthermore, the invention can be also applied to an audio outputting device (a speaker). Though it is not shown practically, when device information to be inhibited is added to the audio outputting device as the secrecy management information 67, it is possible to perform the inhibition control to the outputting media like the displaying of the image information is allowed but the audio information is inhibited to output.

At all events, it is possible to control the disclosing level of every device and terminal connected with a network by providing the management function of the secrecy information with each device.

The first to the sixth embodiments as described as above explain regarding a case where the copying is inhibited by using the copy inhibition information. However, the following eighth to tenth embodiments explain a configuration that is able to specify and trace a device when unauthorized copies are outputted by a personal computer, a printer, a scanner or the like.

Embodiment 8

Figure 14:
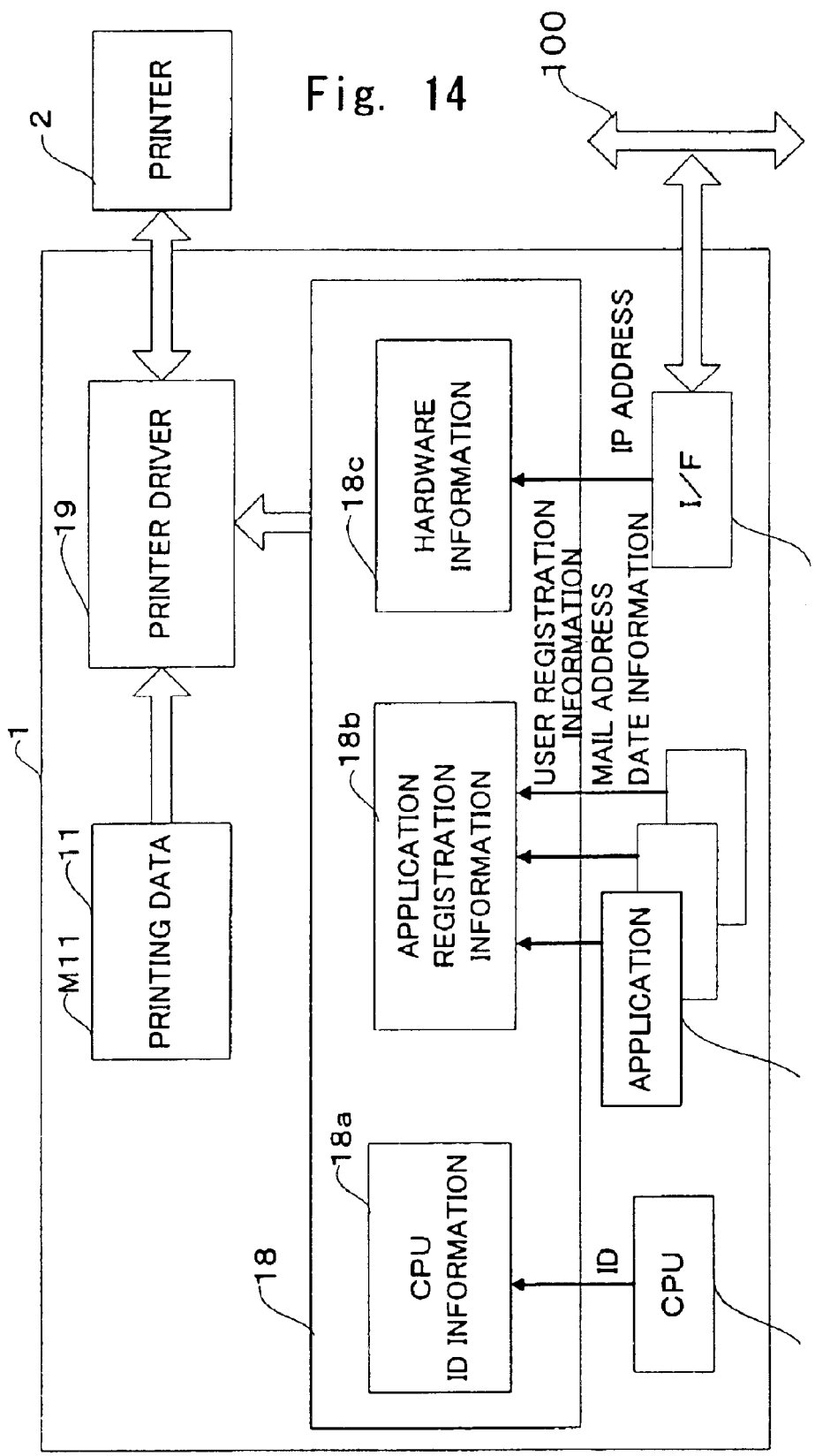
FIG. 14 is a block diagram of a personal computer of the eighth embodiment of the invention.

FIG. 14 is a block diagram of an information imparting circuit for imparting ID information, which is unique to a device, to printing data to be printed by a printer.

An information imparting circuit 18 extracts CPU ID information 18a included in a central processing unit (which is called CPU hereunder) installed the PC1, and sends the information to a printer driver 19. The printer driver 19 imparts the CPU ID information 18a to printing data 11 stored in a printing memory M11, which is outputted as new printing data to a printer 2. In this case, since the CPU ID information 18a is proper and unique to the PC1, the ID is effective as information resource for managing users.

Likewise, the information imparting circuit 18 obtains from each application software 92 application registration information 18b provided with the PC, and sends the information to the printer driver 19. The information to be registered is time information and information of user who uses a device, like the user registration information and mail address. The printer driver 19 imparts the application registration information 18b to the printing data 11, which is sent to the printer 2 as a new printing data.

The application registration information 18b is user information at the installing, a specific product No. assigned to user, a user password, and etc. The mail address set in an application by a user is valid to trace an address of the operating user and becomes an information resource valid to specify a device, a location, and the time of user concerned with the copying. The registration information of the operating system (which is called OS hereafter) of the PC1 may be used as the application registration information 18b. The application registration information may be substituted with any information of the installed software that can specify a user or software.

Likewise, the information imparting circuit 18 extracts hardware information 18c installed in the PC1, and then sends the information to the printer driver 19. The printer driver 19 imparts the hardware information 18c to the printing data 11, which is outputted to the printer 2 as a new printing data. The information imparting circuit 18 obtains as hardware information the information of a substrate installing the CPU of the PC1 and IP address configured in the network interface 93. Information of the connected printer 2 may be obtained from a driver.

In the 8th embodiment as described above, the information for specifying the location, the time and the operating user of the device or the software can be detected automatically and then imparted to the printing data, thereby it is possible to trace the location, the time and the operating user that the copies originated from. Therefore since a device outputting the copies can be detected quickly and the preparation status of the printing data remains as the evidence, it is possible to suppress the spreading of the unauthorized copying and minimize the leak of the secrecy information.

Embodiment 9

Figure 15:
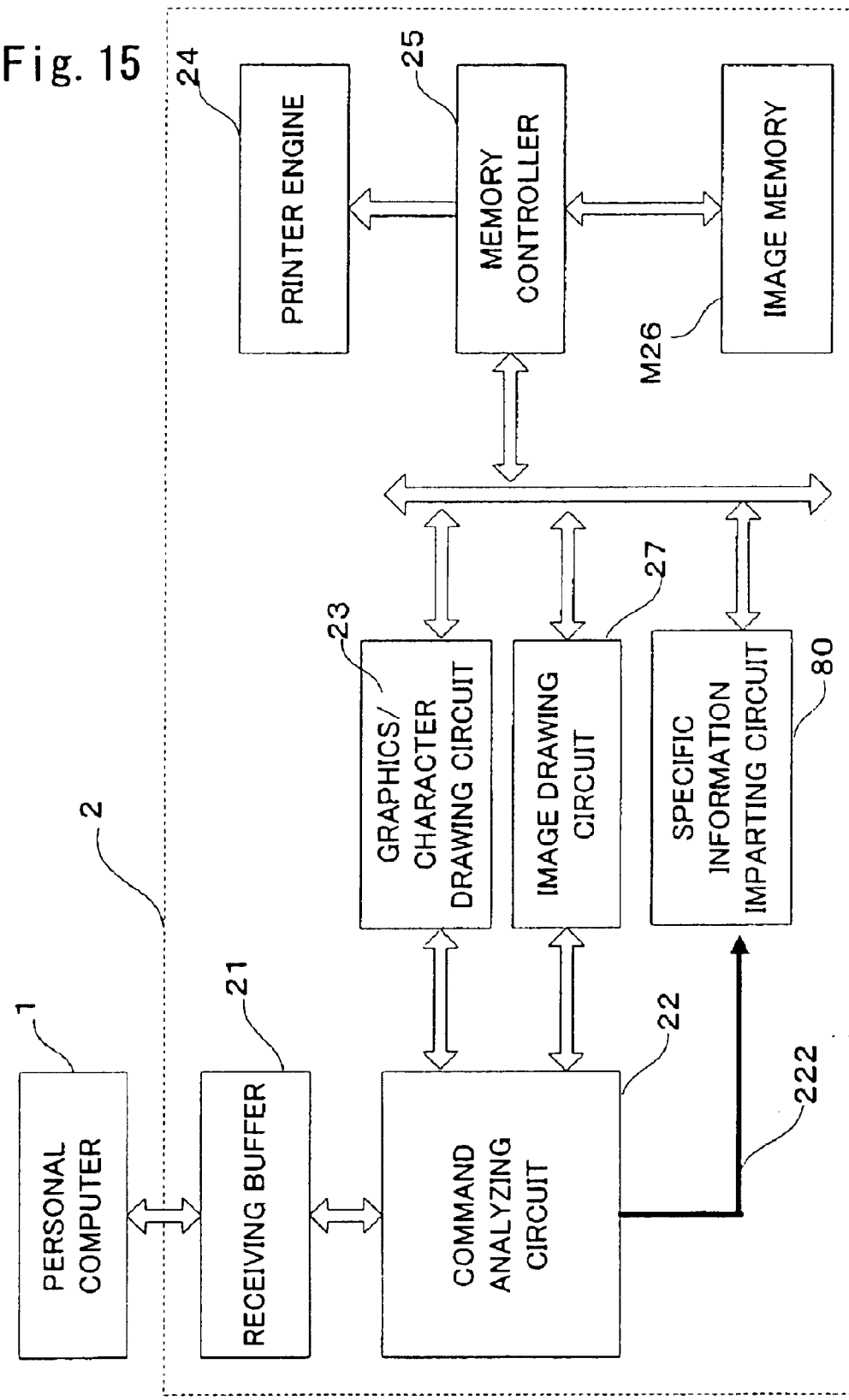
FIG. 15 is a block diagram of a printer in the ninth embodiment of the invention.

FIG. 15 is a block diagram of a printer provided with a tracing function.

The printer 2 receives the printing data from the PC1 by making use of the receiving buffer 21, and sends the printing data to the command analyzing circuit 22 one after another. The command analyzing circuit 22 analyses the language and image data format of the received printing data.

While analyzing the language and image data format of the received printing data, the command analyzing circuit 22 extracts ID information 222 (the device information, the software information, the hardware information) to be imparted to the printing data automatically, and then send the data to a specific information imparting circuit 80.

Next, according to a result analyzed by the command analyzing circuit 22 as described above like the first embodiment, the graphics/character drawing circuit 23 executes the drawing of characters and in graphics on the image memory M26, meanwhile the image drawing circuit 27 expands photo data on the image memory M26.

Figure 16:
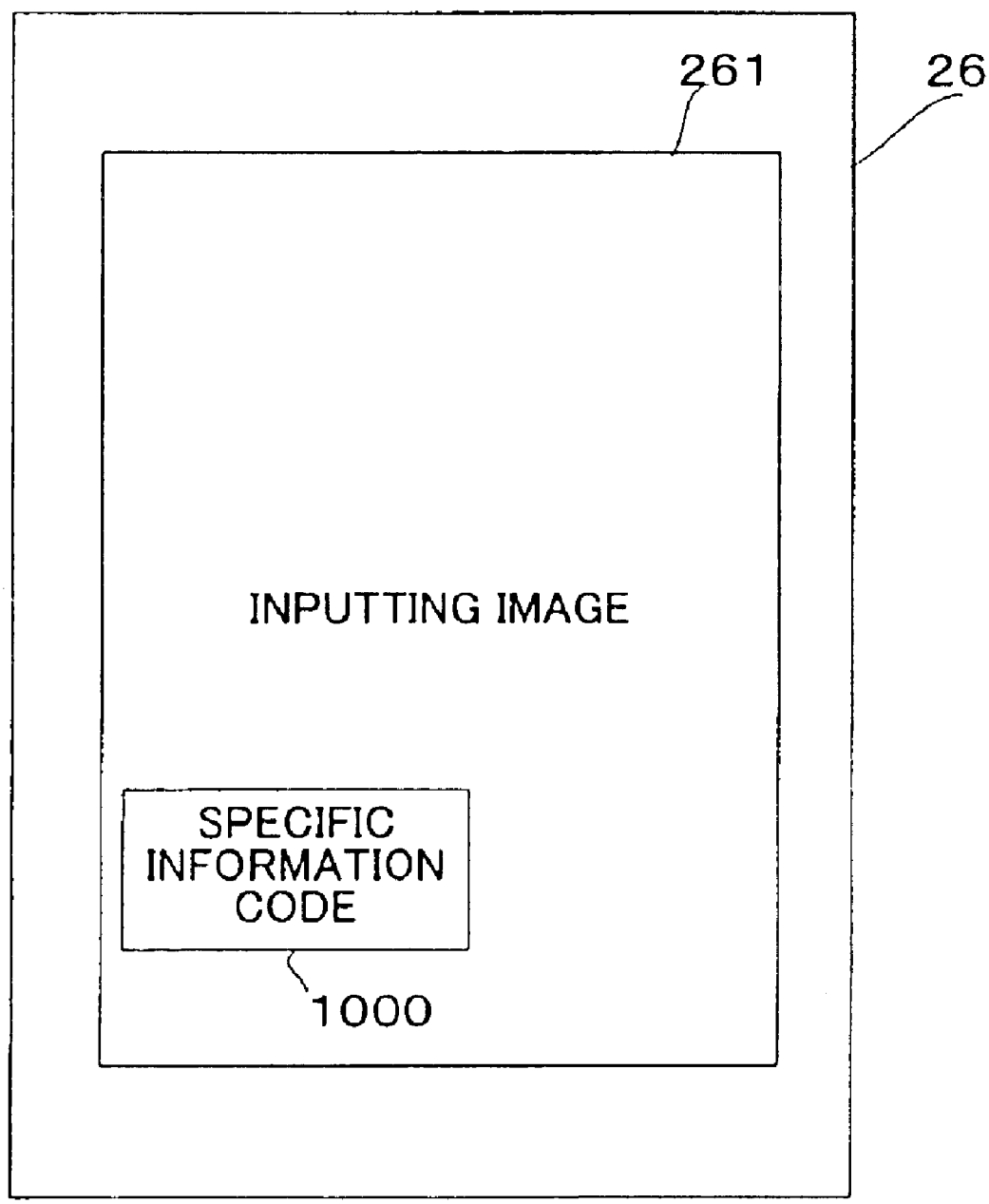
FIG. 16 is a diagram showing a result of the printing in the ninth embodiment of the invention.

In addition, the specific information imparting circuit 80 modulates the ID information 222 at specific pattern on the image memory M26 via the memory controller 25, and then imparts the data to the image expanded on the image memory M26. For example, the specific information code 1000 is imparted on the printing data 261 as shown in FIG. 16, otherwise may be sent direct to the printer engine 24 a specific pattern, which is printed on a recording paper.

When a desired image data is formed on the image memory M26, the memory controller 25 transfers the image data to printer engine 24. The printer engine 24 performs the printing based on the received image data.

In the 9th embodiment as described above, the printer 2 extracts the imparted specific information from received printing data, and then imparts the specific information to the printing data automatically when the printer 2 prints the printing data in its self. Thereby it is possible to trace a device that performs the unauthorized copy of confidential documents in company or the forgery of bank notes and cash vouchers.

Embodiment 10

Figure 17:
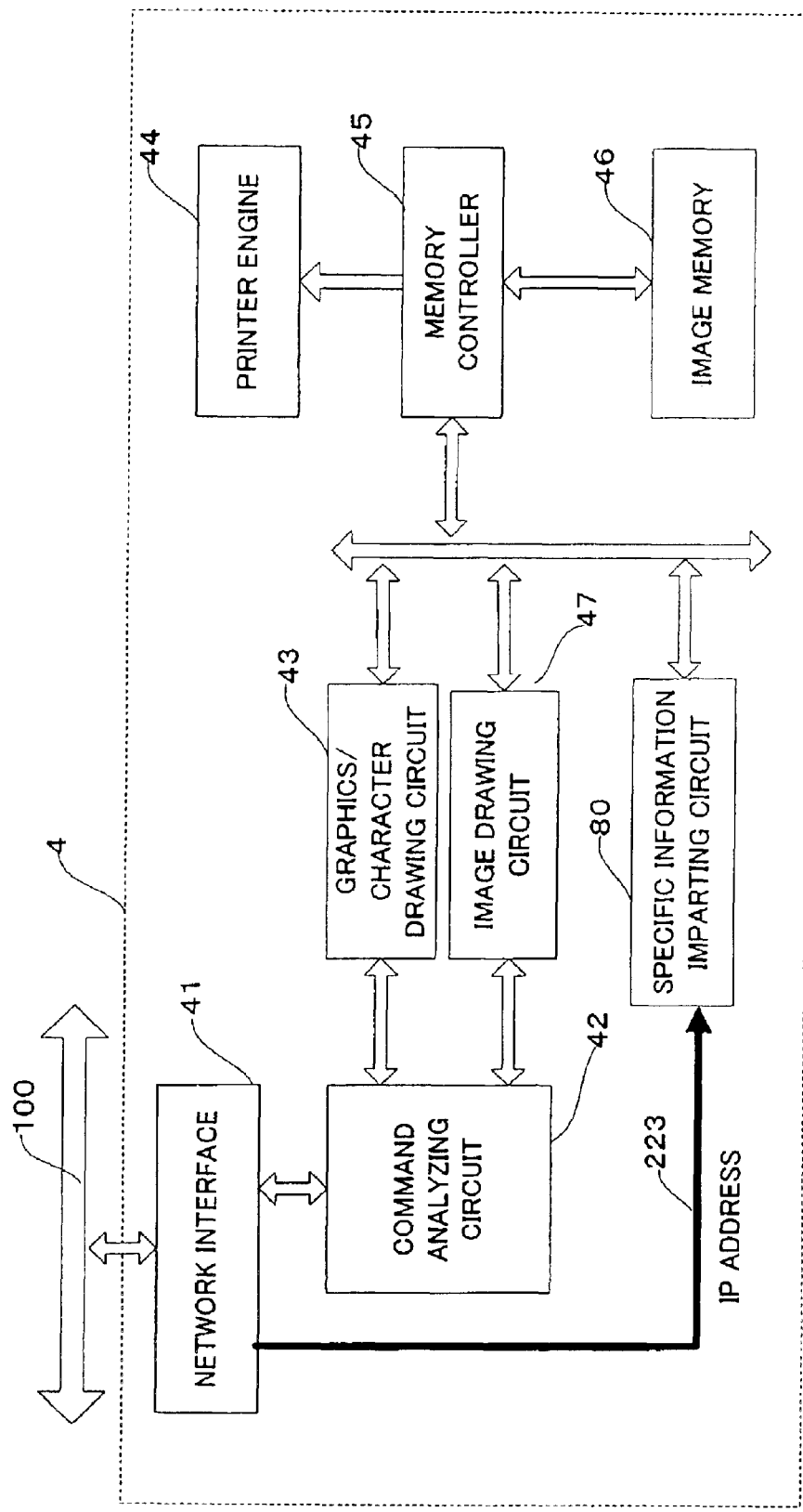
FIG. 17 is a block diagram showing a network printer in the tenth embodiment of the invention.
Figure 18:
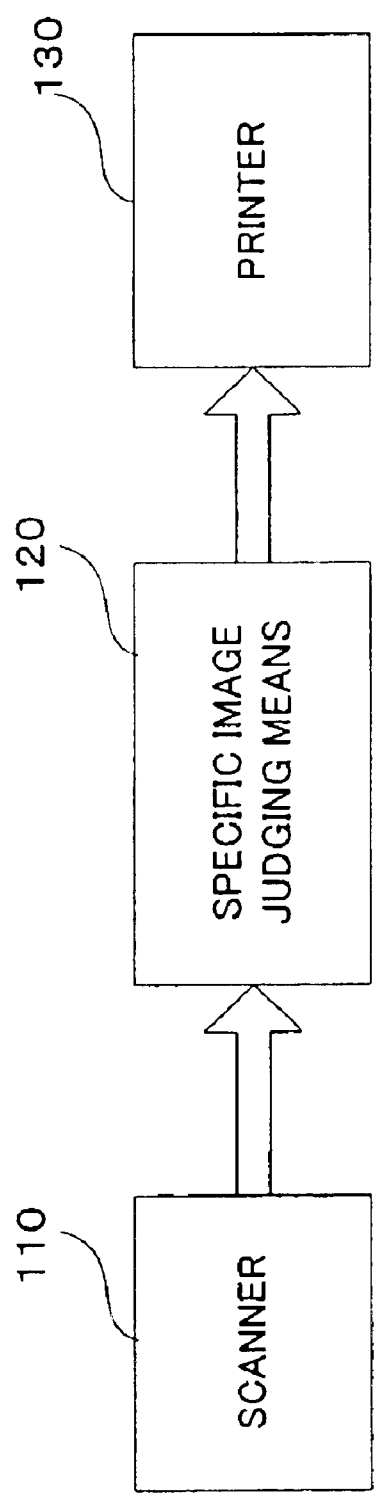
FIG. 18 is a block diagram of a color copying machine of prior arts.

FIG. 17 is a block diagram of a printer connected with the network and provided with the tracing function.

The printer 4 receives printing data from the PC1 via network interface 41, and then sends the printing data to a command analyzing circuit 42 one after another. The command analyzing circuit 42 analyses the language and the image data format of the received printing data.

Next, a graphics/character drawing circuit 43 draws characters and graphics, and an image drawing circuit 47 expands photo data; since these processing are the same as in the first to the eighth embodiment, the explanations are not described here.

The specific information imparting circuit 80 extracts from the network interface 41 an IP address 223 imparted to the printer 4, and modulates the IP address 223 at specific pattern on an image memory M46 via a memory controller 45, and then imparts the data to the expanded image. The imparted form is the same as in the 9th embodiment and the IP address is imparted on the printing data as the specific information code as shown in FIG. 16. It is needless to say that this IP address may be extracted from the command analyzing circuit 42 as described in the 9th embodiment. And it is may be arranged that the IP address be sent direct to the printer engine 44 as a specific pattern and printed on a recording paper.

When the desired image is formed on the image memory M46, the memory controller 45 transfers the image data to a printer engine 44. The printer engine 44 performs the printing based on the received image data.

In the 10th embodiment as described above, the ID information (IP address) of the printer 4 connected with the network is imparted on the printing data automatically when the printer 4 prints the printing data in its self. Thereby it is easy to specify and trace the device and the location that performs the unauthorized copy of confidential documents in company or the forgery of bank notes and cash vouchers. Therefore, it is possible to prevent the spread of the leak of the secrecy information.

Besides, the copying device of the invention can be carried out by software of CPU and DSP. And it may be carried out by dedicated hardware, too.

In addition, the device can be installed as software of the secrecy document management into the database, the distribution system, the document change software like E-mail, or the document delivery software.

Since this embodiment of the invention can be applied to not only static images but also moving images, the invention adapts to the moving image data management.

Moreover, since the embodiment of the invention can accommodate to the various type of data, such as original image data, document text data, encrypted data and etc., in a scanner, a printer, and a personal computer, the invention can be utilized for not only the printing but also the monitor displaying.

As described above, it is possible to prevent the unauthorized copying and browsing of originals and electronic data in advance and speedy because the invention can update the copy inhibition information. Additionally, since the invention is provided with the secrecy management function, it is possible to stop the above inhibition function for a specific user corresponding to the secrecy management level granted to the user.

Furthermore, it is possible to trace the origin of the unauthorized copies since the information for identifying a device processing the printing data can be added to the printing data.

Besides, each means described in each embodiment can be carried out by the configuration of hardware, and also can be carried out by a CPU and the programming installed in the CPU.

POSSIBILITY OF INDUSTRIAL APPLICATION

As described in the above embodiments, the invention can be adapted to the prevention of the unauthorized copying and browsing of documents and drawings in companies. Even in the same business office, users who are allowed to copy and browse specific documents are distinguished from other users. In addition, the invention can be applied to the trace of a device that prepares copies of bank notes or cash vouchers which are inhibited to copy in general.

What is claimed is:

1. A data monitoring method comprising:

activating an information obtaining means automatically at the time of inputting originals:

monitoring each copy element of monitoring object data consisting of at least one kind of copy element in accordance with at least one kind of copy element in accordance with at least one kind of copy inhibition information stored in inhibition information storage;

inhibition input or output of the monitoring object data if the monitoring determines that said each copy element agrees with a kind of said copy inhibition information; and obtaining the copy inhibition information by means of the information obtaining means from a master information storage on a network by issuing a request if originals of said copy inhibition information are stored in the master information storage on the network, wherein the request executing a step of obtaining the copy inhibition information is issued when the network printer is activated.

2. A data monitoring method comprising:

activating an information obtaining means automatically at the time of inputting originals;

monitoring each copy element of monitoring object data consisting of at least one kind of copy element in accordance with at least one kind of copy element in accordance with at least one kind of copy inhibition information stored in inhibition information storage;

inhibition input or output of the monitoring object data if the monitoring determines that said each copy element agrees with a kind of said copy inhibition information; and obtaining the copy inhibition information by means of the information obtaining means from a master information storage on a network by issuing a request if originals of said copy inhibition information are stored in the master information storage on the network, wherein the request executing a step of obtaining the copy inhibition information is issued when the printing data is inputted to the image memory or outputted from the image memory.

3. A data monitoring device comprising:

monitoring means activating an information obtaining means automatically at the time of inputting originals and monitoring at least one kind of copy element prepared from monitoring object data based on the copy inhibition information;

inhibition means inhibiting input or output of the monitoring object data if said at least one copy element included in the monitoring object data agrees with one of the copy inhibition information;

a master information storage on the network storing originals of the copy inhibition information; and information obtaining means obtaining the copy inhibition information from said master information storage on a network by issuing a request, wherein the information obtaining means obtains the copy inhibition information based on the request issued when the network printer is activated.

4. A data monitoring device comprising:

monitoring means activating an information obtaining means automatically at the time of inputting originals and monitoring at least one kind of copy element prepared from monitoring object data based on the copy inhibition information;

inhibition means inhibiting input or output of the monitoring object data if said at least one copy element included in the monitoring object data agrees with one of the copy inhibition information;

a master information storage on the network storing originals of the copy inhibition information; and information obtaining means obtaining the copy inhibition information from said master information storage on a network by issuing a request, wherein the information obtaining means obtains the copy inhibition information based on the request issued when the printing data is inputted to the image memory or outputted from the image memory.

* * * * *